(12) United States Patent
Okazaki

(10) Patent No.: US 9,976,049 B2
(45) Date of Patent: May 22, 2018

(54) HYDROPHILIC MONOLAYER FILMS

(71) Applicant: MITSUI CHEMICALS, INC., Minato-ku, Tokyo (JP)

(72) Inventor: Koju Okazaki, Ichihara (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 0 days. days.

(21) Appl. No.: 15/307,045

(22) PCT Filed: May 12, 2015

(86) PCT No.: PCT/JP2015/063615
§ 371 (c)(1),
(2) Date: Oct. 27, 2016

(87) PCT Pub. No.: WO2015/178248
PCT Pub. Date: Nov. 26, 2015

(65) Prior Publication Data
US 2017/0044393 A1 Feb. 16, 2017

(30) Foreign Application Priority Data
May 19, 2014 (JP) ................ 2014-103180

(51) Int. Cl.
C08L 43/00 (2006.01)
C09D 133/14 (2006.01)
B32B 27/30 (2006.01)
C08F 220/26 (2006.01)
C09D 5/16 (2006.01)
(Continued)

(52) U.S. Cl.
CPC ............ C09D 133/14 (2013.01); B32B 7/06 (2013.01); B32B 7/12 (2013.01); B32B 9/045 (2013.01); B32B 15/08 (2013.01); B32B 27/08 (2013.01); B32B 27/10 (2013.01); B32B 27/16 (2013.01); B32B 27/283 (2013.01); B32B 27/30 (2013.01); B32B 27/302 (2013.01); B32B 27/304 (2013.01); B32B 27/306 (2013.01); B32B 27/308 (2013.01); B32B 27/32 (2013.01); B32B 27/36 (2013.01); B32B 27/365 (2013.01); B32B 27/38 (2013.01); B32B 27/40 (2013.01); B32B 29/00 (2013.01); C08F 220/26 (2013.01); C08F 222/1006 (2013.01); C08J 7/04 (2013.01); C09D 5/16 (2013.01); C09D 133/04 (2013.01); C09D 133/24 (2013.01); C09D 135/02 (2013.01); C09D 157/00 (2013.01); C09D 157/06 (2013.01); C09D 157/10 (2013.01); B32B 2250/02 (2013.01); B32B 2255/06 (2013.01); B32B 2255/10 (2013.01); B32B 2255/12 (2013.01); B32B 2255/26 (2013.01); B32B 2255/28 (2013.01); B32B 2262/101 (2013.01); B32B 2264/104 (2013.01); B32B 2307/21 (2013.01); B32B 2307/412 (2013.01); B32B 2307/518 (2013.01); B32B 2307/728 (2013.01); B32B 2307/732 (2013.01); B32B 2307/754 (2013.01); B32B 2405/00 (2013.01); B32B 2419/00 (2013.01); B32B 2457/20 (2013.01); B32B 2471/00 (2013.01); B32B 2479/00 (2013.01); B32B 2605/00 (2013.01); B32B 2607/00 (2013.01); C08F 12/30 (2013.01); C08F 212/14 (2013.01); C08F 2222/104 (2013.01); C08F 2222/1026 (2013.01)

(58) Field of Classification Search
CPC ................ C09D 133/14; C09D 5/16
USPC ......................................... 524/547
See application file for complete search history.

(56) References Cited

U.S. PATENT DOCUMENTS 4,274,933 A   6/1981 Kamada et al.
4,351,881 A   9/1982 Kamada et al.
(Continued)

FOREIGN PATENT DOCUMENTS

CN   101309760 A   11/2008
CN   103025766 A   4/2013
(Continued)

OTHER PUBLICATIONS

International Search Report (PCT/ISA/210) dated Aug. 18, 2015, by the Japanese Patent Office as the International Searching Authority for International Application No. PCT/JP2015/063615.
(Continued)

Primary Examiner — Hui Chin
(74) Attorney, Agent, or Firm — Buchanan, Ingersoll & Rooney PC

(57) ABSTRACT

The invention provides monolayer films excellent in hydrophilicity and transparency which include a crosslinked resin having a surface enriched with hydrophilic groups, and materials which exhibit excellent properties such as hydrophilicity, antifogging properties and antifouling properties by virtue of having the above monolayer films. A monolayer film is fabricated which includes a crosslinked resin obtained by polymerizing a composition including a compound (I) having an anionic hydrophilic group and a functional group with a polymerizable carbon-carbon double bond, and a compound (II) having three or more hydroxyl groups and three or more functional groups with a polymerizable carbon-carbon double bond, the monolayer film having a gradient (Sa/Da) of not less than 1.1 wherein Sa is the surface concentration of the anionic hydrophilic groups in the monolayer film, and Da is the deep concentration of the hydrophilic groups at ½ of the thickness of the monolayer film.

4 Claims, 1 Drawing Sheet

(51) Int. Cl.

| | |
|---|---|
| C09D 133/04 | (2006.01) |
| C09D 133/24 | (2006.01) |
| C09D 157/00 | (2006.01) |
| C09D 157/06 | (2006.01) |
| C09D 157/10 | (2006.01) |
| C08F 222/10 | (2006.01) |
| C09D 135/02 | (2006.01) |
| B32B 7/06 | (2006.01) |
| B32B 7/12 | (2006.01) |
| B32B 9/04 | (2006.01) |
| B32B 15/08 | (2006.01) |
| B32B 27/08 | (2006.01) |
| B32B 27/10 | (2006.01) |
| B32B 27/16 | (2006.01) |
| B32B 27/28 | (2006.01) |
| B32B 27/32 | (2006.01) |
| B32B 27/36 | (2006.01) |
| B32B 27/38 | (2006.01) |
| B32B 27/40 | (2006.01) |
| B32B 29/00 | (2006.01) |
| C08J 7/04 | (2006.01) |
| C08F 212/14 | (2006.01) |
| C08F 12/30 | (2006.01) |

(56) References Cited

U.S. PATENT DOCUMENTS

| | | | |
|---|---|---|---|
| 9,238,769 B2 | 1/2016 | Okazaki | |
| 2009/0191373 A1* | 7/2009 | Okazaki | C03C 17/30 428/41.8 |
| 2013/0156959 A1 | 6/2013 | Okazaki | |
| 2014/0154451 A1 | 6/2014 | Okazaki | |
| 2015/0126682 A1 | 5/2015 | Okazaki | |

FOREIGN PATENT DOCUMENTS

| | | |
|---|---|---|
| CN | 103703036 A | 4/2014 |
| EP | 3081578 A1 | 10/2016 |
| JP | 55-090516 A | 7/1980 |
| JP | 2001-098007 A | 4/2001 |
| JP | 2005-187576 A | 7/2005 |
| JP | 2011-229734 A | 11/2011 |
| WO | WO 2007/064003 A1 | 6/2007 |
| WO | WO 2012/014829 A1 | 2/2012 |
| WO | WO 2013/187311 A1 | 12/2013 |

OTHER PUBLICATIONS

Written Opinion (PCT/ISA/237) dated Aug. 18, 2015, by the Japanese Patent Office as the International Searching Authority for International Application No. PCT/JP2015/063615.

"Development of Acrylic Oligomers for Anti-Fogging Performance", Trend, Annual Research Report by Toagosei Co., Ltd., Feb. 1999 issue, pp. 39-44 (with partial English translation, pp. 1-14).

Fumitoshi Tsukiyama, "Waterborne Architectural Stain-Resistance Paints", Kobunshi (High Polymers), 1995, vol. 44, No. 5, p. 307 (with English language translation, pp. 1-5).

Akira Chiba et al., "Mechanism of Stain Prevention by Surface Hydrophilization", Mirai Zairyou (Materials for the Future), vol. 2, No. 1, pp. 36-41 (with partial English language translation, pp. 1-2).

Extended Search Report issued by the European Patent Office in corresponding European Patent Application No. 15796384.4 dated Nov. 22, 2017 (8 pages).

The First Office Action issued by The State Intellectual Property Office of People's Republic of China in corresponding Chinese Patent Application No. 201580022466.4 dated Mar. 2, 2018 (14 pages including partial English translation).

* cited by examiner

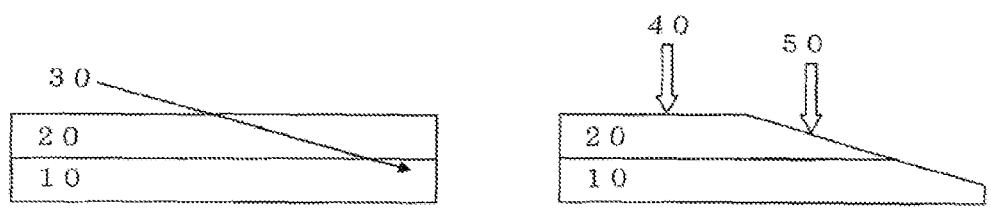

HYDROPHILIC MONOLAYER FILMS

TECHNICAL FIELD

The present invention relates to hydrophilic monolayer films.

BACKGROUND ART

There have recently been increasing demands that substrates formed of organic materials such as plastics and inorganic materials such as glass be improved in terms of antifogging properties and antifouling properties.

To solve the fogging problems, a method has been proposed in which an antifogging coating containing a reactive surfactant and an acrylic oligomer is applied to provide enhanced hydrophilicity and water absorption (see, for example, Non Patent Document 1). The fouling problems have been addressed by methods in which the hydrophilicity of the surface of materials is enhanced so that fouling such as airborne hydrophobic substances which have become attached to surfaces such as exterior walls can be detached and removed from the surfaces by water spray or rainfall (see, for example, Non Patent Documents 2 and 3).

Further, hydrophilic materials have been proposed in which a crosslinkable polymerizable monomer composition is applied onto the surface of a substrate and is incompletely polymerized while controlling the dose of UV irradiation to form a crosslinked polymer, and subsequently a hydrophilic monomer is applied and UV rays are applied again to block- or graft-polymerize the hydrophilic monomer to the surface of the crosslinked polymer (Patent Document 1 and Patent Document 2).

However, this simple block or graft polymerization of a hydrophilic monomer to the surface of a substrate only attaches the hydrophilic groups to the surface, resulting in low durability. Thus, the hydrophilic materials have drawbacks in that they cannot withstand long-term use.

Further, there have been presented hydrophilic materials which include a compound having an anionic hydrophilic group and an ethanolamine (Patent Document 5), and hydrophilic materials which include a compound having a non-neutralized anionic hydrophilic group and an inorganic colloid sol (Patent Document 6). However, the incorporation of an ethanolamine causes problems such as sticky surface due to the ethanolamine per se remaining inside the film, and poor affinity for water. The use of a compound having a non-neutralized anionic hydrophilic group results in problems such as that the film will not attain sufficient hydrophilicity and will have low transparency.

To solve the above problem, the present inventors have proposed a monolayer film in which specific anionic hydrophilic groups have a concentration gradient (an uneven distribution) between the inside of the film and the film surface and the anionic hydrophilic groups are present in a higher concentration near the surface (Patent Document 3 and Patent Document 4).

Films obtained by such methods attain excellent hydrophilicity and transparency. However, a further enhancement in transparency is often demanded in applications where extremely high transparency is required, for example, in optical components.

CITATION LIST

Patent Literature

Patent Document 1: JP-A-2001-98007
Patent Document 2: JP-A-2011-229734
Patent Document 3: WO 2007/064003
Patent Document 4: WO 2012/014829
Patent Document 5: JP-A-S55-90516
Patent Document 6: JP-A-2005-187576

Non Patent Literature

Non Patent Document 1: TREND, annual research report by TOAGOSEI CO., LTD., 1999, February issue, pp. 39-44
Non Patent Document 2: Kobunshi (Polymers), 44(5), p. 307
Non Patent Document 3: Mirai Zairyou (Future materials), 2(1), pp. 36-41

SUMMARY OF INVENTION

Technical Problem

An object of the invention is to provide monolayer films excellent in hydrophilicity and transparency which include a crosslinked resin having a surface enriched with hydrophilic groups, and materials which exhibit excellent properties such as hydrophilicity, antifogging properties and antifouling properties by virtue of having the above monolayer films.

Solution to Problem

The present inventors carried out studies directed to achieving the above object. As a result, the present inventors have found that a hydrophilic monolayer film which has a surface enriched with hydrophilic groups and exhibits higher transparency than heretofore attained can be obtained by polymerizing a composition including:

a compound (I) having an anionic hydrophilic group and a functional group with a polymerizable carbon-carbon double bond, and a compound (II) having three or more hydroxyl groups and two or more, or preferably three or more functional groups with a polymerizable carbon-carbon double bond. The present invention has been completed based on the finding.

Specifically, an aspect of the invention resides in a monolayer film including a crosslinked resin obtained by polymerizing a composition including:

a compound (I) having an anionic hydrophilic group and at least one functional group with a polymerizable carbon-carbon double bond, and a compound (II) having three or more hydroxyl groups and two or more, or preferably three or more functional groups with a polymerizable carbon-carbon double bond (but the compound does not have anionic hydrophilic groups), the monolayer film having a gradient (Sa/Da) of not less than 1.1 wherein Sa is the surface concentration of the anionic hydrophilic groups in the monolayer film, and Da is the deep concentration of the hydrophilic groups at ½ of the thickness of the monolayer film.

The compound (I) is preferably a compound represented by the general formula (100) described later. In the general formula (100), A is preferably a functional group with at least one polymerizable carbon-carbon double bond selected from the general formulas (121) to (125) described later.

The compound (II) is preferably a compound represented by the general formula (200) described later.

A stack according to the present invention includes at least one monolayer film described above.

Advantageous Effects of Invention

By being polymerized, the composition used in the invention gives a monolayer film which includes the crosslinked resin having a surface enriched with hydrophilic groups. The monolayer film has excellent hydrophilicity and transparency, and may be used as a material with excellent properties such as antifogging properties and antifouling properties.

BRIEF DESCRIPTION OF DRAWING

FIG. 1 is a schematic view illustrating a method of preparing a sample for the measurement of the gradient of anion concentration (Sa/Da) in Examples.

DESCRIPTION OF EMBODIMENTS

The composition used in the production of the inventive monolayer films includes the compound (I) and the compound (II) described below.

[Compounds (I)]

The compound (I) has an anionic hydrophilic group and a functional group with a polymerizable carbon-carbon double bond. By virtue of the incorporation of such a compound having an anionic hydrophilic group and a functional group with a carbon-carbon double bond, hydrophilicity can be imparted to a monolayer film which includes the crosslinked resin obtained by the polymerization of the composition.

Examples of the anionic hydrophilic groups include sulfonate groups, carboxyl groups, phosphate groups, O-sulfate groups (—O—SO$_3^-$) and N-sulfate groups (—NH—SO$_3^-$). Of the anionic hydrophilic groups, sulfonate groups, carboxyl groups and phosphate groups are preferable, and sulfonate groups are more preferable.

The compound (I) has at least one anionic hydrophilic group. The anionic hydrophilic group may be present in the form of an acid formed by the bonding between the anion and a hydrogen ion, or in the form of a salt formed by the bonding between the anion and a counter cation other than a hydrogen ion.

Thus, the sulfonate group, the carboxyl group, the phosphate group, the O-sulfate group and the N-sulfate group may be typically present in the compound (I) in the form of (α), (β), (γ1) or (γ2), (δ) and (ε), respectively, represented by the following formulas:

  (α)

  (β)

  (γ1)

  (γ2)

  (δ)

  (ε)

In the formulas (α) to (ε), Z is at least one monovalent cation selected from hydrogen ions, ammonium ions, alkali metal ions, and alkaline earth metals having ½ atomic valence. In the invention, the ammonium ion is a cation resulting from the bonding of a hydrogen ion to ammonia, a primary amine, a secondary amine or a tertiary amine.

From the point of view of hydrophilicity, the ammonium ion is preferably a cation in which a hydrogen ion is bonded to ammonia or an amine having a small number of carbon atoms, and is more preferably an ammonium ion formed by the bonding of a hydrogen ion to ammonia, or methylammonium.

Examples of the alkali metals include lithium, sodium, potassium and rubidium.

Examples of the alkaline earth metals include beryllium, magnesium, calcium, strontium and barium.

Of the anionic hydrophilic groups, those in the form of a salt (in which a counter cation other than a hydrogen ion is bonded) tend to be more preferable because the obtainable monolayer film attains hydrophilicity more efficiently.

When the anionic hydrophilic group is represented by any of the above formulas (α) to (ε), Z is preferably an ammonium ion, an alkali metal ion or an alkaline earth metal ion having ½ atomic valence, more preferably an alkali metal ion, and still more preferably a sodium ion, a potassium ion or a rubidium ion.

When the anionic group is other than the sulfonate group, the O-sulfate group and the N-sulfate group, typically, when the anionic group is the carboxyl group or the phosphate group, hydrophilicity may not be obtained efficiently at times unless the group is in the form of a salt.

The compound (I) further has at least one functional group with a polymerizable carbon-carbon double bond. The functional groups with a polymerizable carbon-carbon double bond are not particularly limited as long as the functional groups can undergo radical polymerization or ion polymerization. Examples include acryloyl group, methacryloyl group, allyl group, methallyl group, vinyl group, isopropenyl group, maleyl group (—CO—CH=CH—CO—), itaconyl group, styryl group, α-methyl-styryl group, and groups including these groups.

Examples of the acryloyl groups include acryloyloxy group, acryloylthio group and acrylamide group. Examples of the methacryloyl groups include methacryloyloxy group, methacryloylthio group and methacrylamide group.

In the following, the acryloyl and the methacryloyl are sometimes collectively referred to as (meth)acryloyl, the acryloyloxy and the methacryloyloxy as (meth)acryloyloxy, the acryloylthio and the methacryloylthio as (meth)acryloylthio, the acrylamide and the methacrylamide as (meth)acrylamide, and the allyl group and the methallyl group as (meth)allyl group.

Of the compounds (I), those compounds represented by the general formula (100) below are preferable.

  (100)

In the formula (100), A is a $C_{2-100}$ organic group having 1 to 5 functional groups with a polymerizable carbon-carbon double bond; CD is a group which includes at least one hydrophilic group selected from those groups represented by the general formulas (101) to (106) below; $n_{12}$ indicates the number of As bonded to CD and is 1 or 2; and $n_{15}$ indicates the number of CDs bonded to A and is an integer of 1 to 5. The functional groups with a polymerizable carbon-carbon double bond are as described hereinabove.

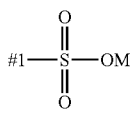
(101)

In the formula (101), M is a hydrogen atom, an alkali metal, an alkaline earth metal having ½ atomic valence or an ammonium ion; and #1 indicates a hand bonded to a carbon atom present in A in the formula (100).

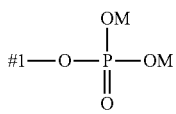
(102)

In the formula (102), M at each occurrence is a hydrogen atom, an alkali metal, an alkaline earth metal having ½ atomic valence or an ammonium ion; and #1 indicates a hand bonded to a carbon atom present in A in the formula (100).

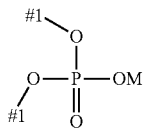
(103)

In the formula (103), M is a hydrogen atom, an alkali metal, an alkaline earth metal having ½ atomic valence or an ammonium ion; and #1 at each occurrence indicates a hand bonded to a carbon atom present in A in the formula (100).

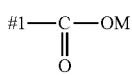
(104)

In the formula (104), M is a hydrogen atom, an alkali metal, an alkaline earth metal having ½ atomic valence, an ammonium ion or an amine ion; and #1 indicates a hand bonded to a carbon atom present in A in the formula (100).

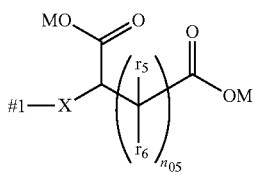
(105)

In the formula (105), $r_5$ and $r_6$ each independently represent a hydrogen atom, a methyl group, an ethyl group or a hydroxyl group; $n_{05}$ is an integer of 0 to 5; X is —O—, —S—, —NH— or —NCH$_3$—; M at each occurrence is a hydrogen atom, an alkali metal, an alkaline earth metal having ½ atomic valence or an ammonium ion; and #1 indicates a hand bonded to a carbon atom present in A in the formula (100).

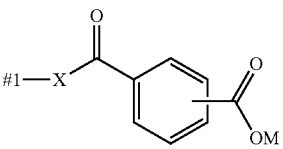
(106)

In the formula (106), X is —O—, —S—, —NH— or —NCH$_3$—; M is a hydrogen atom, an alkali metal, an alkaline earth metal having ½ atomic valence or an ammonium ion; and #1 indicates a hand bonded to a carbon atom present in A in the formula (100).

In the general formulas (101) to (106), the definitions, specific examples and preferred embodiments of the ammonium ions, the alkali metals and the alkaline earth metals are the same as described hereinabove with respect to the formulas (α) to (ε).

Of the groups represented by the general formulas (101) to (106), those groups represented by the general formulas (101) to (104) are preferable, and those groups represented by the general formula (101) are more preferable.

In the general formula (100), A is preferably a functional group with at least one polymerizable carbon-carbon double bond selected from the general formulas (121) to (125) below.

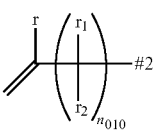
(121)

In the formula (121), r represents a hydrogen atom or a methyl group; $r_1$ and $r_2$ each independently represent a hydrogen atom, a methyl group, an ethyl group or a hydroxyl group; $n_{010}$ is an integer of 0 to 10; and #2 indicates a hand bonded to #1 present in at least one group selected from those groups represented by the general formulas (101) to (106).

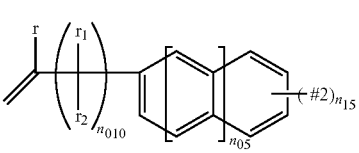
(122)

In the formula (122), r represents a hydrogen atom or a methyl group; $r_1$ and $r_2$ each independently represent a hydrogen atom, a methyl group, an ethyl group or a hydroxyl group; $n_{010}$ is an integer of 0 to 10; $n_{05}$ is an integer of 0 to 5; $n_{15}$ is an integer of 1 to 5; and #2 indicates a hand bonded to #1 present in at least one group selected from those groups represented by the general formulas (101) to (106).

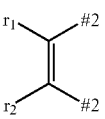
(123)

In the formula (123), $r_1$ and $r_2$ each independently represent a hydrogen atom, a methyl group, an ethyl group or a hydroxyl group; and #2 at each occurrence indicates a hand bonded to #1 present in at least one group selected from those groups represented by the general formulas (101) to (106).

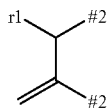
(124)

In the formula (124), $r_1$ represents a hydrogen atom, a methyl group, an ethyl group or a hydroxyl group; and #2 at each occurrence indicates a hand bonded to #1 present in at least one group selected from those groups represented by the general formulas (101) to (106).

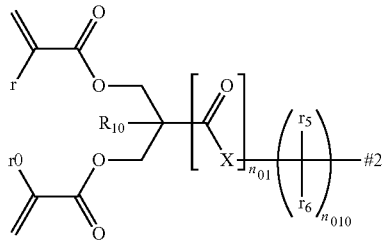
(125)

In the formula (125), X is —O—, —S—, —NH— or —NCH$_3$—; r and r0 each independently represent a hydrogen atom or a methyl group; $r_5$ and $r_6$ each independently represent a hydrogen atom, a methyl group, an ethyl group or a hydroxyl group; $R_{10}$ represents a hydrogen atom, a $C_{1-10}$ alkyl group, a $C_{3-10}$ cycloalkyl group, a phenyl group, a benzyl group, a hydroxyl group, hydroxymethyl or hydroxyethyl; $n_{01}$ represents 0 or 1; $n_{010}$ is an integer of 1 to 10; and #2 indicates a hand bonded to #1 present in at least one group selected from those groups represented by the general formulas (101) to (106).

Of the compounds (I) having an anionic hydrophilic group, those compounds represented by the general formulas (Ia) to (Ib) and (Ih) to (Ij) below are more preferable.

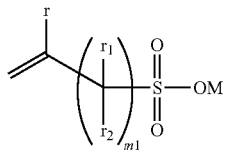
(Ia)

In the formula (Ia), r represents a hydrogen atom or a methyl group; $r_1$ and $r_2$ each independently represent a hydrogen atom, a methyl group, an ethyl group or a hydroxyl group; and m1 is an integer of 0 to 10.

In the formula (Ia), M represents a hydrogen ion, an ammonium ion, an alkali metal ion or an alkaline earth metal ion having ½ atomic valence. In particular, an ammonium ion, an alkali metal ion or an alkaline earth metal ion having ½ atomic valence is preferable, and an alkali metal ion is more preferable.

Examples of the compounds represented by the general formula (Ia) include vinylsulfonic acid, lithium vinylsulfonate, sodium vinylsulfonate, potassium vinylsulfonate, rubidium vinylsulfonate, ammonium vinylsulfonate, magnesium vinylsulfonate, calcium vinylsulfonate, isopropenylsulfonic acid, lithium isopropenylsulfonate, sodium isopenylsulfonate, potassium isopropenylsulfonate, rubidium isopropenylsulfonate, ammonium isopropenylsulfonate, magnesium isopropenylsulfonate, calcium isopropenylsulfonate, (meth)allylsulfonic acid, lithium (meth)allylsulfonate, sodium (meth)allylsulfonate, potassium (meth)allylsulfonate, rubidium (meth)allylsulfonate, ammonium (meth)allylsulfonate, magnesium (meth)allylsulfonate, calcium (meth)allylsulfonate, 5,6-hexenyl-1-sulfonic acid, lithium 5,6-hexenyl-1-sulfonate, sodium 5,6-hexenyl-1-sulfonate, potassium 5,6-hexenyl-1-sulfonate, rubidium 5,6-hexenyl-1-sulfonate, ammonium 5,6-hexenyl-1-sulfonate, magnesium 5,6-hexenyl-1-sulfonate and calcium 5,6-hexenyl-1-sulfonate.

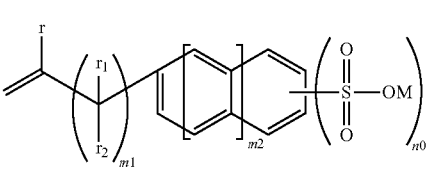
(Ib)

In the formula (Ib), r represents a hydrogen atom or a methyl group; $r_1$ and $r_2$ each independently represent a hydrogen atom, a methyl group, an ethyl group or a hydroxyl group; m1 is an integer of 0 to 10; m2 is an integer of 0 to 5; and n0 is an integer of 1 to 5.

In the formula (Ib), M represents a hydrogen ion, an ammonium ion, an alkali metal ion or an alkaline earth metal ion having ½ atomic valence. In particular, an ammonium ion, an alkali metal ion or an alkaline earth metal ion having ½ atomic valence is preferable, and an alkali metal ion is more preferable.

Examples of the compounds represented by the general formula (Ib) include styrenesulfonic acid, lithium styrenesulfonate, sodium styrenesulfonate, potassium styrenesulfonate, rubidium styrenesulfonate, ammonium styrenesulfonate, magnesium styrenesulfonate, calcium styrenesulfonate, α-methyl-styrenesulfonic acid, lithium α-methyl-styrenesulfonate, sodium α-methyl-styrenesulfonate, potassium α-methyl-styrenesulfonate, rubidium α-methyl-styrenesulfonate, ammonium α-methyl-styrenesulfonate, magnesium α-methyl-styrenesulfonate, calcium α-methyl-styrenesulfonate, allylbenzenesulfonic acid, lithium allylbenzenesulfonate, sodium allylbenzenesulfonate, potassium allylbenzenesulfonate, rubidium allylbenzenesulfonate, ammonium allylbenzenesulfonate, magnesium allylbenzenesulfonate, calcium allylbenzenesulfonate, methallylbenzenesulfonic acid, lithium methallylbenzenesulfonate, sodium methallylbenzenesulfonate, potassium methallylbenzenesulfonate, rubidium methallylbenzenesulfonate, ammonium methallylbenzenesulfonate, magnesium methallylbenzenesulfonate, calcium methallylbenzenesulfonate, vinylnaphthalenesulfonic acid, lithium vinylnaphthalenesulfonate, sodium vinylnaphthalenesulfonate, potassium vinylnaphthalenesulfonate, rubidium vinylnaphthalenesulfonate, ammonium vinylnaphthalenesulfonate, magnesium vinylnaphthalenesulfonate, calcium vinylnaphthalenesulfonate, isopropenylnaphthalenesulfonic acid, lithium isopropenylnaphthalenesulfonate, sodium isopropenylnaphthalenesulfonate, potassium isopropenylnaphthalenesulfonate, rubidium isopropenylnaphthalenesulfonate, ammonium isopropenylnaphthalenesulfonate, magnesium isopropenylnaphthalenesulfonate, calcium isopropenylnaphthalenesulfonate, allylnaphthalenesulfonic acid, lithium allylnaphthalenesulfonate, sodium allylnaphthalenesulfonate, potassium allylnaphthalenesulfonate, rubidium allylnaphthalenesulfonate, ammonium allylnaphthalenesulfonate, magnesium allylnaphthalenesulfonate, calcium allylnaphthalenesulfonate, methallylnaphthalenesulfonic acid, lithium methallylnaphthalenesulfonate, sodium methallylnaphthalenesulfonate, potassium methallylnaphthalenesulfonate, rubidium methallylnaphthalenesulfonate, ammonium methallylnaphthalenesulfonate, magnesium methallylnaphthalenesulfonate, calcium methallylnaphthalenesulfonate, vinylanthracenesulfonic acid, lithium vinylanthracenesulfonate, sodium vinylanthracenesulfonate, potassium vinylanthracenesulfonate, rubidium vinylanthracenesulfonate, ammonium vinylanthracenesulfonate, magnesium vinylanthracenesulfonate, calcium vinylanthracenesulfonate, isopropenylanthracenesulfonic acid, lithium isopropenylanthracenesulfonate, sodium isopropenylanthracenesulfonate, potassium isopropenylanthracenesulfonate, rubidium isopropenylanthracenesulfonate, ammonium isopropenylanthracenesulfonate, magnesium isopropenylanthracenesulfonate, calcium isopropenylanthracenesulfonate, allylanthracenesulfonic acid, lithium allylanthracenesulfonate, sodium allylanthracenesulfonate, potassium allylanthracenesulfonate, rubidium allylanthracenesulfonate, ammonium allylanthracenesulfonate, magnesium allylanthracenesulfonate, calcium allylanthracenesulfonate, methallylanthracenesulfonic acid, lithium methallylanthracenesulfonate, sodium methallylanthracenesulfonate, potassium methallylanthracenesulfonate, rubidium methallylanthracenesulfonate, ammonium methallylanthracenesulfonate, magnesium methallylanthracenesulfonate, calcium methallylanthracenesulfonate, vinylphenanthrenesulfonic acid, lithium vinylphenanthrenesulfonate, sodium vinylphenanthrenesulfonate, potassium vinylphenanthrenesulfonate, rubidium vinylphenanthrenesulfonate, ammonium vinylphenanthrenesulfonate, magnesium vinylphenanthrenesulfonate, calcium vinylphenanthrenesulfonate, isopropenylphenanthrenesulfonic acid, lithium isopropenylphenanthrenesulfonate, sodium isopropenylphenanthrenesulfonate, potassium isopropenylphenanthrenesulfonate, rubidium isopropenylphenanthrenesulfonate, ammonium isopropenylphenanthrenesulfonate, magnesium isopropenylphenanthrenesulfonate, calcium isopropenylphenanthrenesulfonate, allylphenanthrenesulfonic acid, lithium allylphenanthrenesulfonate, sodium allylphenanthrenesulfonate, potassium allylphenanthrenesulfonate, rubidium allylphenanthrenesulfonate, ammonium allylphenanthrenesulfonate, magnesium allylphenanthrenesulfonate, calcium allylphenanthrenesulfonate, methallylphenanthrenesulfonic acid, lithium methallylphenanthrenesulfonate, sodium methallylphenanthrenesulfonate, potassium methallylphenanthrenesulfonate, rubidium methallylphenanthrenesulfonate, ammonium methallylphenanthrenesulfonate, magnesium methallylphenanthrenesulfonate, calcium methallylphenanthrenesulfonate, styrenedisulfonic acid, dilithium styrenedisulfonate, disodium styrenedisulfonate, dipotassium styrenedisulfonate, dirubidium styrenedisulfonate, diammonium styrenedisulfonate, magnesium styrenedisulfonate, calcium styrenedisulfonate, isopropenylbenzenedisulfonic acid, lithium isopropenylbenzenedisulfonate, sodium isopropenylbenzenedisulfonate, potassium isopropenylbenzenedisulfonate, rubidium isopropenylbenzenedisulfonate, ammonium isopropenylbenzenedisulfonate, magnesium isopropenylbenzenedisulfonate, calcium isopropenylbenzenedisulfonate, vinylnaphthalenetrisulfonic acid, trilithium vinylnaphthalenetrisulfonate, trisodium vinylnaphthalenetrisulfonate, tripotassium vinylnaphthalenetrisulfonate, trirubidium vinylnaphthalenetrisulfonate, triammonium vinylnaphthalenetrisulfonate, magnesium vinylnaphthalenetrisulfonate, calcium vinylnaphthalenetrisulfonate, isopropenylnaphthalenetrisulfonic acid, dilithium isopropenylnaphthalenetrisulfonate, disodium isopropenylnaphthalenetrisulfonate, dipotassium isopropenylnaphthalenetrisulfonate, dirubidium isopropenylnaphthalenetrisulfonate, diammonium isopropenylnaphthalenetrisulfonate, magnesium isopropenylnaphthalenetrisulfonate and calcium isopropenylnaphthalenetrisulfonate.

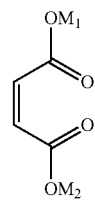

(Ih)

In the formula (Ih), $M_1$ and $M_2$ each independently represent a hydrogen ion, an ammonium ion, an alkali metal ion or an alkaline earth metal ion having ½ atomic valence. In particular, an ammonium ion, an alkali metal ion or an alkaline earth metal ion having ½ atomic valence is preferable, and an alkali metal ion is more preferable.

Examples of the compounds represented by the general formula (Ih) include maleic acid, lithium maleate, dilithium maleate, sodium maleate, disodium maleate, potassium maleate, dipotassium maleate, ammonium maleate, diammonium maleate, magnesium maleate and calcium maleate.

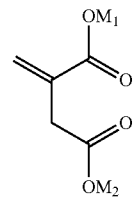

(Ii)

In the formula (Ii), $M_1$ and $M_2$ each independently represent a hydrogen ion, an ammonium ion, an alkali metal ion or an alkaline earth metal ion having ½ atomic valence. In particular, an ammonium ion, an alkali metal ion or an alkaline earth metal ion having ½ atomic valence is preferable, and an alkali metal ion is more preferable.

Examples of the compounds represented by the general formula (Ii) include itaconic acid, lithium itaconate, dilithium itaconate, sodium itaconate, disodium itaconate, potassium itaconate, dipotassium itaconate, ammonium itaconate, diammonium itaconate, magnesium itaconate and calcium itaconate.

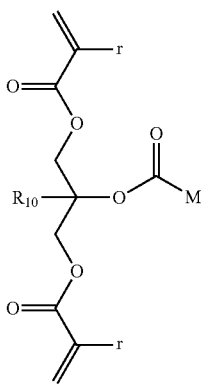

(Ij)

In the formula (Ij), r independently at each occurrence represents a hydrogen atom or a methyl group; and $R_{10}$ represents a hydrogen atom, a $C_{1-10}$ alkyl group, a $C_{3-10}$ cycloalkyl group, a phenyl group, a benzyl group, a hydroxyl group, hydroxymethyl or hydroxyethyl.

In the formula (Ij), M represents a hydrogen ion, an ammonium ion, an alkali metal ion or an alkaline earth metal ion having ½ atomic valence. In particular, an ammonium ion, an alkali metal ion or an alkaline earth metal ion having ½ atomic valence is preferable, and an alkali metal ion is more preferable.

Examples of the compounds represented by the general formula (Ij) include 2,2-bis{(meth)acryloyloxyethyl}acetic acid, sodium 2,2-bis{(meth)acryloyloxyethyl}acetate salt, potassium 2,2-bis{(meth)acryloyloxyethyl}acetate salt, rubidium 2,2-bis{(meth)acryloyloxyethyl}acetate salt, ammonium 2,2-bis{(meth)acryloyloxyethyl}acetate salt, calcium 2,2-bis{(meth)acryloyloxyethyl}acetate salt, magnesium 2,2-bis{(meth)acryloyloxyethyl}acetate salt, 2,2-bis{(meth)acryloyloxyethyl}propionic acid, sodium 2,2-bis{(meth)acryloyloxyethyl}propionate salt, potassium 2,2-bis{(meth)acryloyloxyethyl}propionate salt, rubidium 2,2-bis{(meth)acryloyloxyethyl}propionate salt, ammonium 2,2-bis{(meth)acryloyloxyethyl}propionate salt, calcium 2,2-bis{(meth)acryloyloxyethyl}propionate salt, magnesium 2,2-bis{(meth)acryloyloxyethyl}propionate salt, 2,2-bis{(meth)acryloyloxyethyl}butyric acid, sodium 2,2-bis{(meth)acryloyloxyethyl}butyrate salt, potassium 2,2-bis{(meth)acryloyloxyethyl}butyrate salt, rubidium 2,2-bis{(meth)acryloyloxyethyl}butyrate salt, ammonium 2,2-bis{(meth)acryloyloxyethyl}butyrate salt, calcium 2,2-bis{(meth)acryloyloxyethyl}butyrate salt, magnesium 2,2-bis{(meth)acryloyloxyethyl}butyrate salt, 2,2-bis{(meth)acryloyloxyethyl}valeric acid, sodium 2,2-bis{(meth)acryloyloxyethyl}valerate salt, potassium 2,2-bis{(meth)acryloyloxyethyl}valerate salt, rubidium 2,2-bis{(meth)acryloyloxyethyl}valerate salt, ammonium 2,2-bis{(meth)acryloyloxyethyl}valerate salt, calcium 2,2-bis{(meth)acryloyloxyethyl}valerate salt and magnesium 2,2-bis{(meth)acryloyloxyethyl}valerate salt.

In the general formulas (Ia) to (Ib) and (Ih) to (Ij), the definitions, specific examples and preferred embodiments of the ammonium ions, the alkali metals and the alkaline earth metals are the same as described hereinabove with respect to the formulas (α) to (ε).

Of the compounds represented by the general formulas (Ia) to (Ib) and (Ih) to (Ij), and those compounds represented by the general formulas (Ia) to (Ib) are more preferable.

The molecular weight of the compounds (I) is usually 72 to 18,000, preferably 72 to 3,000, and more preferably 72 to 1,000.

The compounds (I) may be used singly, or two or more may be used in combination.

The composition used to produce the monolayer films of the invention contains the compound (I) described above. At least some of the molecules of the compound (I) may be reacted to form an oligomer in the composition. Here, the oligomer usually contains 2 to 20 repeating units derived from the compound (I).

The compounds (I) may be produced by a known method or a method that is deemed as known. Alternatively, the compounds (I) may be purchased from the market.

[Compounds (II)]

The compound (II) has three or more hydroxyl groups and two or more, or preferably three or more functional groups having a polymerizable carbon-carbon double bond. The compound (II) has no anionic hydrophilic groups and differs from the compound (I). As a result of the incorporation of such a compound, the composition can give, upon polymerization, a monolayer film including the sufficiently cross-linked resin. Examples of the functional groups with a polymerizable carbon-carbon double bond include those groups mentioned hereinabove as the functional groups with a polymerizable carbon-carbon double bond that are present in the compounds (I). As the functional groups having a polymerizable carbon-carbon double bond, (meth)acryloyl groups, vinyl groups, (meth)allyl groups, styryl groups and isopropenyl groups are preferable, (meth)acryloyl groups, (meth)allyl groups and styryl groups are more preferable, and (meth)acryloyl groups are still more preferable.

As mentioned in the section of the compounds (I), examples of the (meth)acryloyl groups include (meth)acryloyloxy group, (meth)acryloylthio group and (meth)acrylamide group. Of these, (meth)acryloyloxy group and (meth)acryloylthio group are preferable.

As the compounds (II), those compounds represented by the general formula (200) below are preferable.

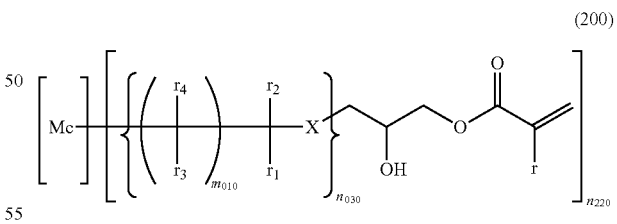

(200)

In the formula (200), Mc indicates at least one group selected from those groups represented by the general formulas (201) to (209) below, and forms the main skeleton of the compound (II) represented by the formula (200).

In the formula (200), X is —O—, —S—, —NH— or —NCH$_3$—; r is a hydrogen atom or a methyl group; $r_1$ to $r_4$ each independently represent a hydrogen atom, a methyl group, an ethyl group or a hydroxyl group; $m_{010}$ is an integer of 0 to 10; $n_{030}$ is an integer of 0 to 30; and $n_{220}$ is an integer of 2 to 20 or preferably an integer of 3 to 20.

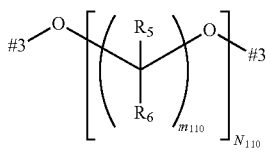

(201)

In the formula (201), $m_{110}$ is an integer of 1 to 10; $N_{110}$ is an integer of 1 to 10; #3 at each occurrence indicates a hydrogen atom or a hand bonded to a carbon atom present in the group represented by the formula (200); $R_5$ and $R_6$ each independently represent a hydrogen atom, a hydroxyl group, —O-#3, —CH$_2$OH, —CH$_2$O—#3 or a $C_{1-4}$ alkyl group; when $m_{110}$ is 2 or greater, $R_5$s and $R_6$s each may be the same as or different from one another; when $m_{110}$ is 2 or greater, #3s may be the same as or different from one another; and there are the same number of hands #3 bonded to a carbon atom present in the group represented by the formula (200) as the number indicated by $n_{220}$ in the formula (200). Preferably, $R_5$ and $R_6$ are such that $R_5$ represents —O-#3 or —CH$_2$O—#3 and $R_6$ represents a hydrogen atom, a hydroxyl group, —O-#3, —CH$_2$OH, —CH$_2$O—#3 or a $C_{1-4}$ alkyl group.

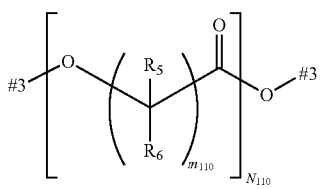

(202)

In the formula (202), $m_{110}$ is an integer of 1 to 10; $N_{110}$ is an integer of 1 to 10; #3 at each occurrence indicates a hydrogen atom or a hand bonded to a carbon atom present in the group represented by the formula (200); $R_5$ and $R_6$ each independently represent a hydrogen atom, a hydroxyl group, —O-#3, —CH$_2$OH, —CH$_2$O—#3 or a $C_{1-4}$ alkyl group; when $m_{110}$ is 2 or greater, $R_5$s and $R_6$s each may be the same as or different from one another; when $m_{110}$ is 2 or greater, #3s may be the same as or different from one another; and there are the same number of hands #3 bonded to a carbon atom present in the group represented by the formula (200) as the number indicated by $n_{220}$ in the formula (200). Preferably, $R_5$ and $R_6$ are such that $R_5$ represents —O-#3 or —CH$_2$O—#3 and $R_6$ represents a hydrogen atom, a hydroxyl group, —O-#3, —CH$_2$OH, —CH$_2$O—#3 or a $C_{1-4}$ alkyl group.

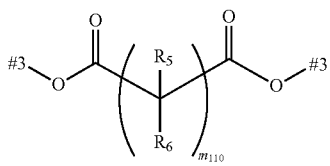

(203)

In the formula (203), $m_{110}$ is an integer of 1 to 10; #3 at each occurrence indicates a hydrogen atom or a hand bonded to a carbon atom present in the group represented by the formula (200); $R_5$ and $R_6$ each independently represent a hydrogen atom, a hydroxyl group, —O-#3, —CH$_2$OH, —CH$_2$O—#3 or a $C_{1-4}$ alkyl group; when $m_{110}$ is 2 or greater, $R_5$s and $R_6$s each may be the same as or different from one another; when $m_{110}$ is 2 or greater, #3s may be the same as or different from one another; and there are the same number of hands #3 bonded to a carbon atom present in the group represented by the formula (200) as the number indicated by $n_{220}$ in the formula (200). Preferably, $R_5$ and $R_6$ are such that $R_5$ represents —O-#3 or —CH$_2$O—#3 and $R_6$ represents a hydrogen atom, a hydroxyl group, —O-#3, —CH$_2$OH, —CH$_2$O—#3 or a $C_{1-4}$ alkyl group.

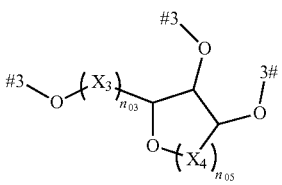

(204)

In the formula (204), $n_{03}$ is an integer of 0 to 3; $n_{05}$ is an integer of 0 to 5; #3 at each occurrence indicates a hydrogen atom or a hand bonded to a carbon atom present in the group represented by the formula (200); $X_3$ and $X_4$ each independently represent —CH$_2$—, —CH(OH)—, —CH(—O-#3)- or —CO—; when $n_{03}$ is 2 or greater, $X_3$s may be the same as or different from one another; when $n_{05}$ is 2 or greater, $X_4$s may be the same as or different from one another; the cycloalkylether ring in the formula (204) may have one or more carbon-carbon double bonds in place of a carbon-carbon bond; and there are the same number of hands #3 bonded to a carbon atom present in the group represented by the formula (200) as the number indicated by $n_{220}$ in the formula (200).

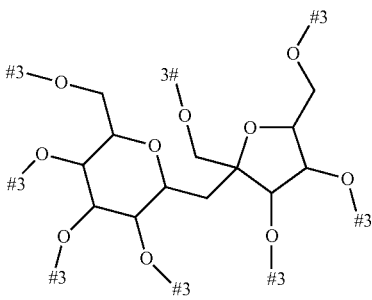

(205)

In the formula (205), #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200).

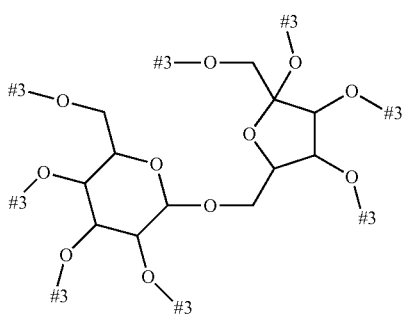
(206)

In the formula (206), #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200).

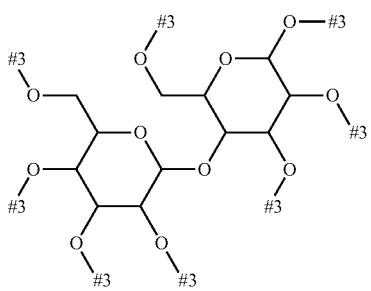
(207)

In the formula (207), #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200).

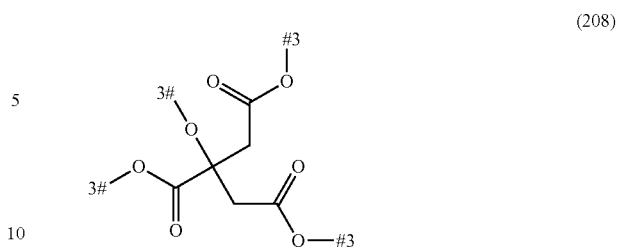
(208)

In the formula (208), #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200).

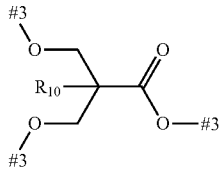
(209)

In the formula (209), $R_{10}$ is a hydrogen atom, a $C_{1-10}$ alkyl group, a $C_{3-10}$ cycloalkyl group, a phenyl group, a benzyl group, a hydroxyl group, a hydroxymethyl group or a hydroxyethyl group; #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200).

Of the compounds (II), those compounds represented by the general formulas (IIb) to (III) below are preferable.

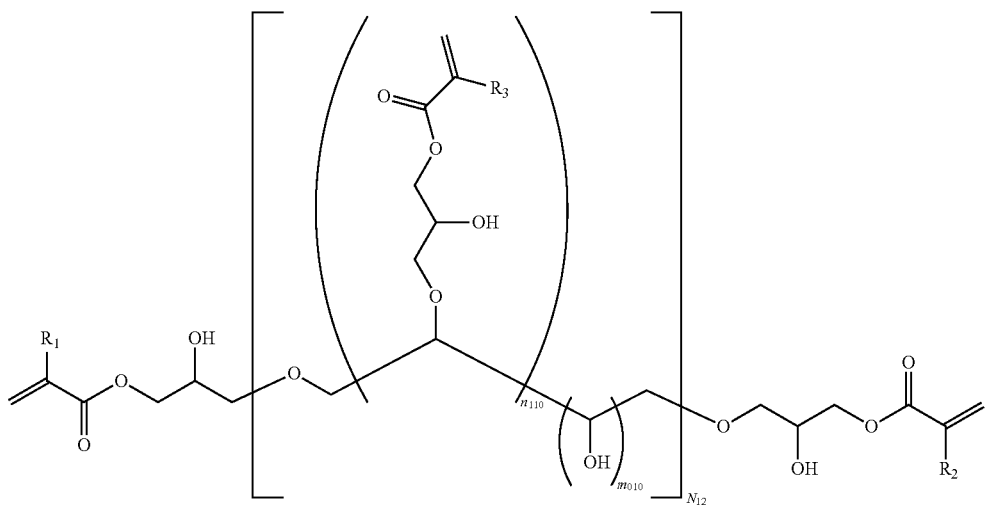
(IIb)

In the formula (IIb), $R_1$, $R_2$ and $R_3$ each independently represent a hydrogen atom or a methyl group.

In the formula (IIb), $m_{010}$ is an integer of 0 to 10; $n_{110}$ is an integer of 1 to 10; and $m_{010}+n_{110}=1$ to 10. Preferably, $m_{010}$ is an integer of 0 to 6, and more preferably an integer of 0 to 4. Preferably, $n_{110}$ is an integer of 1 to 6, and more preferably an integer of 1 to 4.

In the formula (IIb), $N_{12}$ indicates 1 or 2. Preferably, $N_{12}$ indicates 1.

Examples of the compounds represented by the general formula (IIb) include erythritol-tri{3-(meth)acryloyloxy-2-hydroxypropyl}ether, erythritol-tetra{3-(meth)acryloyloxy-2-hydroxypropyl}ether xylitol-tri{3-(meth)acryloyloxy-2-hydroxypropyl}ether, xylitol-tetra{3-(meth)acryloyloxy-2-hydroxypropyl}ether, xylitol-penta{3-(meth)acryloyloxy-2-hydroxypropyl}ether, arabitol-tri{3-(meth)acryloyloxy-2-hydroxypropyl}ether, arabitol-tetra{3-(meth)acryloyloxy-2-hydroxypropyl}ether, arabitol-penta{3-(meth)acryloyloxy-2-hydroxypropyl}ether, ribitol-tri{3-(meth)acryloyloxy-2-hydroxypropyl}ether, ribitol-tetra{3-(meth)acryloyloxy-2-hydroxypropyl}ether, ribitol-penta{3-(meth)acryloyloxy-2-hydroxypropyl}ether, galactitol-tri{3-(meth)acryloyloxy-2-hydroxypropyl}ether, galactitol-tetra{3-(meth)acryloyloxy-2-hydroxypropyl}ether, galactitol-penta{3-(meth)acryloyloxy-2-hydroxypropyl}ether, galactitol-hexa{3-(meth)acryloyloxy-2-hydroxypropyl}ether, mannitol-tri{3-(meth)acryloyloxy-2-hydroxypropyl}ether, mannitol-tetra{3-(meth)acryloyloxy-2-hydroxypropyl}ether, mannitol-penta{3-(meth)acryloyloxy-2-hydroxypropyl}ether, mannitol-hexa{3-(meth)acryloyloxy-2-hydroxypropyl}ether, sorbitol-tri{3-(meth)acryloyloxy-2-hydroxypropyl}ether, sorbitol-tetra{3-(meth)acryloyloxy-2-hydroxypropyl}ether, sorbitol-penta{3-(meth)acryloyloxy-2-hydroxypropyl}ether and sorbitol-hexa{3-(meth)acryloyloxy-2-hydroxypropyl}ether.

In the formula (IIc), $R_1$, $R_2$ and $R_3$ each independently represent a hydrogen atom or a methyl group.

In the formula (IIc), $m_{010}$ is an integer of 0 to 10; $n_{110}$ is an integer of 1 to 10; and $m_{010}+n_{110}=1$ to 10. Preferably, $n_{110}$ is an integer of 0 to 6, and more preferably an integer of 0 to 4.

In the formula (IIc), $N_{12}$ indicates 1 or 2. Preferably, $N_{12}$ indicates 1.

Examples of the compounds represented by the general formula (IIc) include glyceric acid-di{3-(meth)acryloyloxy-2-hydroxypropyl}ether-{3-(meth)acryloyloxy-2-hydroxypropyl}ester, threonic acid-di{3-(meth)acryloyloxy-2-hydroxypropyl}ether-{3-(meth)acryloyloxy-2-hydroxypropyl}ester, threonic acid-tri{3-(meth)acryloyloxy-2-hydroxypropyl}ether-{3-(meth)acryloyloxy-2-hydroxypropyl} ester, gluconic acid-di{3-(meth)acryloyloxy-2-hydroxypropyl}ether-{3-(meth)acryloyloxy-2-hydroxypropyl}ester, gluconic acid-tri{3-(meth)acryloyloxy-2-hydroxypropyl}ether-{3-(meth)acryloyloxy-2-hydroxypropyl}ester, gluconic acid-tetra{3-(meth)acryloyloxy-2-hydroxypropyl}ether-{3-(meth)acryloyloxy-2-hydroxypropyl} ester, gluconic acid-penta{3-(meth)acryloyloxy-2-hydroxypropyl}ether-{3-(meth)acryloyloxy-2-hydroxypropyl} ester, glucoheptanoic acid-di{3-(meth)acryloyloxy-2-hydroxypropyl}ether-{3-(meth)acryloyloxy-2-hydroxypropyl} ester, glucoheptanoic acid-tri{3-(meth)acryloyloxy-2-hydroxypropyl}ether-{3-(meth)acryloyloxy-2-hydroxypropyl} ester, glucoheptanoic acid-tetra{3-(meth)acryloyloxy-2-hydroxypropyl}ether-{3-(meth)acryloyloxy-2-hydroxypropyl} ester, glucoheptanoic acid-penta{3-(meth)acryloyloxy-2-hydroxypropyl}ether-{3-(meth)acryloyloxy-2-hydroxypropyl} ester and glucoheptanoic acid-hexa{3-(meth)acryloyloxy-2-hydroxypropyl}ether-{3-(meth)acryloyloxy-2-hydroxypropyl} ester.

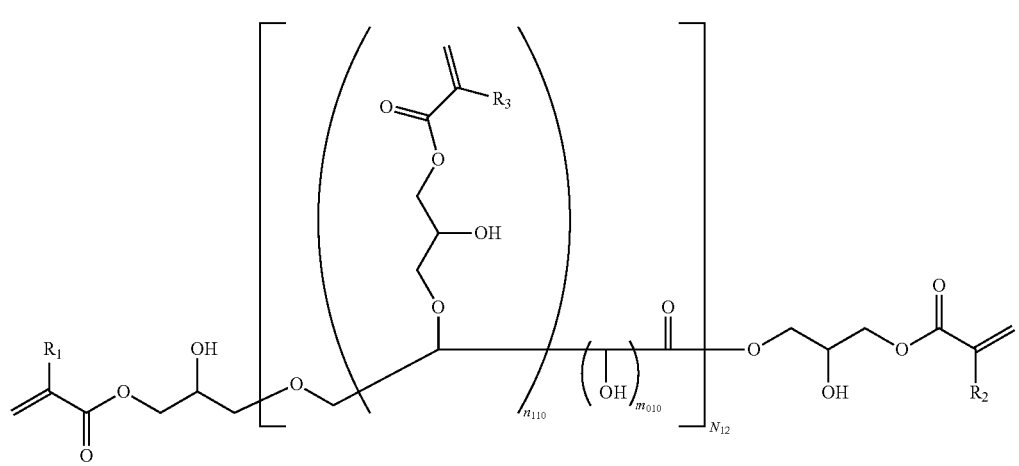

(IIc)

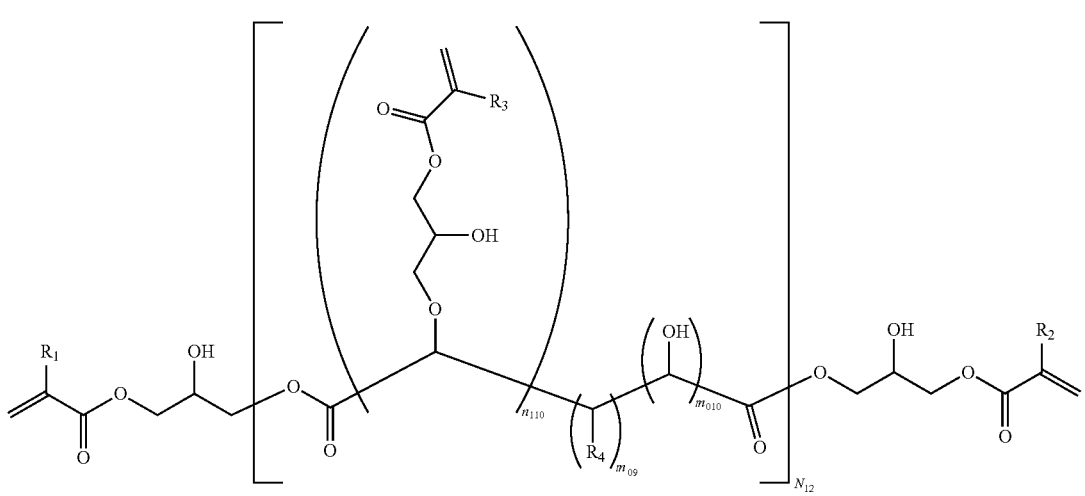

In the formula (IId), $m_{09}$ is an integer of 0 to 9; $m_{010}$ is an integer of 0 to 10; $n_{110}$ is an integer of 1 to 10; $m_{09}+m_{010}+n_{110}=1$ to 10; and $m_{010}+n_{110}=1$ to 10. Preferably, $n_{110}$ is an integer of 1 to 6, and more preferably an integer of 1 to 4. Preferably, $m_{09}$ is an integer of 0 to 6, and more preferably an integer of 0 to 4. Preferably, $m_{010}$ is an integer of 0 to 6, and more preferably an integer of 0 to 4.

In the formula (IId), $N_{12}$ indicates 1 or 2. Preferably, $N_{12}$ indicates 1.

In the formula (IId), $R_1$, $R_2$, $R_3$ and $R_4$ each independently represent a hydrogen atom or a methyl group. When $m_{09}$ is 2 or greater, $R_4$s may be the same as or different from one another.

Examples of the compounds represented by the general formula (IId) include malic acid-mono{3-(meth)acryloyloxy-2-hydroxypropyl}ether-di{3-(meth)acryloyloxy-2-hydroxypropyl} ester, tartaric acid-mono{3-(meth)acryloyloxy-2-hydroxypropyl}ether-di{3-(meth)acryloyloxy-2-hydroxypropyl} ester, tartaric acid-di{3-(meth)acryloyloxy-2-hydroxypropyl}ether-di{3-(meth)acryloyloxy-2-hydroxypropyl} ester, tetrahydroxyadipic acid-mono{3-(meth)acryloyloxy-2-hydroxypropyl}ether-di{3-(meth)acryloyloxy-2-hydroxypropyl}ester, tetrahydroxyadipic acid-di{3-(meth)acryloyloxy-2-hydroxypropyl}ether-di{3-(meth)acryloyloxy-2-hydroxypropyl}ester, tetrahydroxyadipic acid-tri{3-(meth)acryloyloxy-2-hydroxypropyl}ether-di{3-(meth)acryloyloxy-2-hydroxypropyl}ester and tetrahydroxyadipic acid-tetra{3-(meth)acryloyloxy-2-hydroxypropyl}ether-di{3-(meth)acryloyloxy-2-hydroxypropyl}ester.

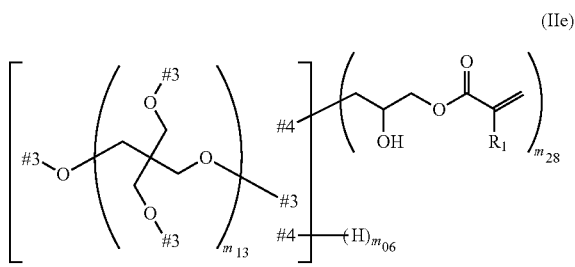

(IIe)

In the formula (IIe), $R_1$ represents a hydrogen atom or a methyl group; #3 and #4 represent bonding hands; and #3 and #4 are bonded together.

In the formula (IIe), $m_{13}$ is an integer of 1 to 3; $m_{28}$ is an integer of 2 to 8, and preferably an integer of 3 to 8; and $m_{06}$ is an integer of 0 to 6. When $m_{13}$ is 1, $m_{28}+m_{08}=4$. When $m_{13}$ is 2, $m_{28}+m_{06}=6$. When $m_{13}$ is 3, $m_{28}+m_{06}=8$. Preferably, $m_{13}$ is an integer of 1 to 2, and more preferably 1.

Examples of the compounds represented by the general formula (IIe) include pentaerythritol-tri{3-(meth)acryloyloxy-2-hydroxypropyl}ether, pentaerythritol-tetra{3-(meth)acryloyloxy-2-hydroxypropyl}ether, dipentaerythritol-tri{3-(meth)acryloyloxy-2-hydroxypropyl}ether, dipentaerythritol-tetra{3-(meth)acryloyloxy-2-hydroxypropyl}ether, dipentaerythritol-penta{3-(meth)acryloyloxy-2-hydroxypropyl}ether, dipentaerythritol-hexa{3-(meth)acryloyloxy-2-hydroxypropyl}ether, tripentaerythritol-tri{3-(meth)acryloyloxy-2-hydroxypropyl}ether, tripentaerythritol-tetra{3-(meth)acryloyloxy-2-hydroxypropyl}ether, tripentaerythritol-penta{3-(meth)acryloyloxy-2-hydroxypropyl}ether, tripentaerythritol-hexa{3-(meth)acryloyloxy-2-hydroxypropyl}ether, tripentaerythritol-hepta{3-(meth)acryloyloxy-2-hydroxypropyl}ether and tripentaerythritol-octa{3-(meth)acryloyloxy-2-hydroxypropyl}ether.

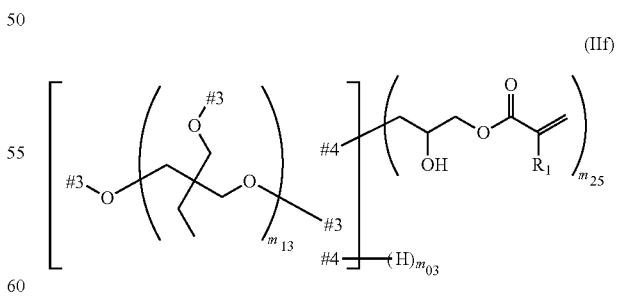

(IIf)

In the formula (IIf), $R_1$ represents a hydrogen atom or a methyl group; #3 and #4 represent bonding hands; and #3 and #4 are bonded together.

In the formula (IIf), $m_{13}$ is an integer of 1 to 3; $m_{25}$ is an integer of 2 to 5, and preferably 3 to 5; and $m_{03}$ is an integer of 0 to 3. When $m_{13}$ is 1, $m_{25}+m_{03}=3$. When $m_{13}$ is 2, $m_{25}+m_{03}=4$. When $m_{13}$ is 3, $m_{25}+m_{03}=5$. Preferably, $m_{13}$ is an integer of 1 to 2, and more preferably 1.

Examples of the compounds represented by the general formula (IIf) include trimethylolpropane-tri{3-(meth)acryloyloxy-2-hydroxypropyl}ether, ditrimethylolpropane-tri{3-(meth)acryloyloxy-2-hydroxypropyl}ether, ditrimethylolpropane-tetra{3-(meth)acryloyloxy-2-hydroxypropyl}ether, tritrimethylolpropane-tri{3-(meth)acryloyloxy-2-hydroxypropyl}ether, tritrimethylolpropane-tetra{3-(meth)acryloyloxy-2-hydroxypropyl}ether and tritrimethylolpropane-penta{3-(meth)acryloyloxy-2-hydroxypropyl}ether.

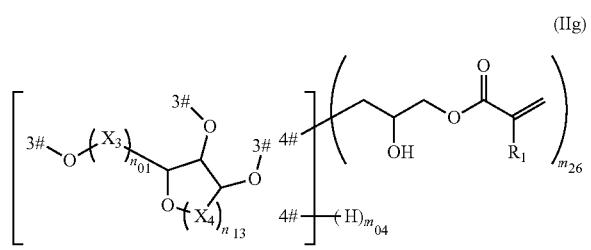

(IIg)

In the formula (IIg), $R_1$ represents a hydrogen atom or a methyl group; #3 and #4 represent bonding hands; and #3 and #4 are bonded together.

In the formula (IIg), $X_3$ and $X_4$ each independently represent —$CH_2$—, —CH(OH)—, —CH(—O-#3)- or —CO—; and when $n_{13}$ is 2 or greater, $X_4$s may be the same as or different from one another.

In the formula (IIg), $m_{26}$ is an integer of 2 to 6, and preferably an integer of 3 to 6; $m_{04}$ is an integer of 0 to 4; $n_{01}$ is an integer of 0 or 1; $n_{13}$ is an integer of 1 to 3; and $m_{04}+m_{26}=3+$(the number of —CH(—O-#3) present as $X_4$).

The cycloalkylether ring in the formula (IIg) may have one or more carbon-carbon double bonds in place of a carbon-carbon bond.

Examples of the compounds represented by the general formula (IIg) include ribose-tri{3-(meth)acryloyloxy-2-hydroxypropyl}ether, ribose-tetra{3-(meth)acryloyloxy-2-hydroxypropyl}ether, ascorbic acid-tri{3-(meth)acryloyloxy-2-hydroxypropyl}ether, ascorbic acid-tetra{3-(meth)acryloyloxy-2-hydroxypropyl}ether, xylose-tri{3-(meth)acryloyloxy-2-hydroxypropyl}ether, xylose-tetra{3-(meth)acryloyloxy-2-hydroxypropyl}ether, sorbitan-tri{3-(meth)acryloyloxy-2-hydroxypropyl}ether, sorbitan-tetra{3-(meth)acryloyloxy-2-hydroxypropyl}ether, glucose-tri{3-(meth)acryloyloxy-2-hydroxypropyl}ether, glucose-tetra{3-(meth)acryloyloxy-2-hydroxypropyl}ether, glucose-penta{3-(meth)acryloyloxy-2-hydroxypropyl}ether, galactose-tri{3-(meth)acryloyloxy-2-hydroxypropyl}ether, galactose-tetra{3-(meth)acryloyloxy-2-hydroxypropyl}ether, galactose-penta{3-(meth)acryloyloxy-2-hydroxypropyl}ether, mannose-tri{3-(meth)acryloyloxy-2-hydroxypropyl}ether, mannose-tetra{3-(meth)acryloyloxy-2-hydroxypropyl}ether, mannose-penta{3-(meth)acryloyloxy-2-hydroxypropyl}ether, (glucono-1,5-lactone)-tri{3-(meth)acryloyloxy-2-hydroxypropyl}ether, (glucono-1,5-lactone)-tetra{3-(meth)acryloyloxy-2-hydroxypropyl}ether and (glucono-1,5-lactone)-penta{3-(meth)acryloyloxy-2-hydroxypropyl}ether.

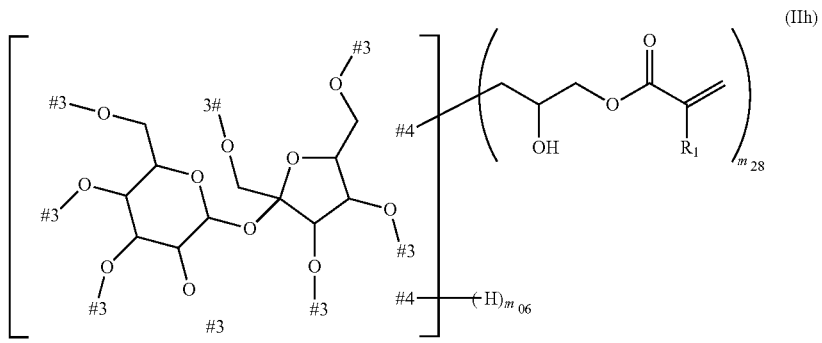

(IIh)

In the formula (IIh), $R_1$ represents a hydrogen atom or a methyl group; #3 and #4 represent bonding hands; and #3 and #4 are bonded together.

In the formula (IIh), $m_{28}$ is an integer of 2 to 8, and preferably an integer of 3 to 8; $m_{06}$ is an integer of 0 to 6; and $m_{28}+m_{06}=8$.

Examples of the compounds represented by the general formula (IIh) include sucrose (also known as saccharose)-tri{3-(meth)acryloyloxy-2-hydroxypropyl}ether, sucrose-tetra{3-(meth)acryloyloxy-2-hydroxypropyl}ether, sucrose-penta{3-(meth)acryloyloxy-2-hydroxypropyl}ether, sucrose-hexa{3-(meth)acryloyloxy-2-hydroxypropyl}ether, sucrose-hepta{3-(meth)acryloyloxy-2-hydroxypropyl}ether and sucrose-octa{3-(meth)acryloyloxy-2-hydroxypropyl}ether.

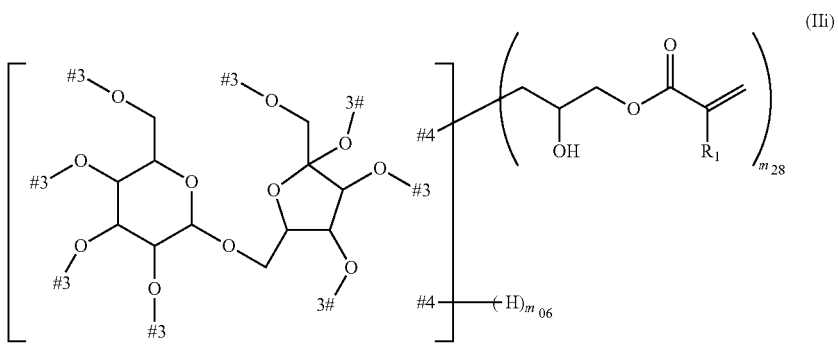

In the formula (IIi), $R_1$ represents a hydrogen atom or a methyl group; #3 and #4 represent bonding hands; and #3 and #4 are bonded together.

In the formula IIh, $m_{28}$ is an integer of 2 to 8, and preferably an integer of 3 to 8; $m_{06}$ is an integer of 0 to 6; and $m_{28}+m_{06}=8$.

Examples of the compounds represented by the general formula (IIi) include Palatinose-tri{3-(meth)acryloyloxy-2-hydroxypropyl}ether, Palatinose-tetra{3-(meth)acryloyloxy-2-hydroxypropyl}ether, Palatinose-penta{3-(meth)acryloyloxy-2-hydroxypropyl}ether, Palatinose-hexa{3-(meth)acryloyloxy-2-hydroxypropyl}ether, Palatinose-hepta{3-(meth)acryloyloxy-2-hydroxypropyl}ether and Palatinose-octa{3-(meth)acryloyloxy-2-hydroxypropyl}ether.

(meth)acryloyloxy-2-hydroxypropyl}ether, maltose-hexa{3-(meth)acryloyloxy-2-hydroxypropyl}ether, maltose-hepta{3-(meth)acryloyloxy-2-hydroxypropyl}ether, maltose-octa{3-(meth)acryloyloxy-2-hydroxypropyl}ether, trehalose-tri{3-(meth)acryloyloxy-2-hydroxypropyl}ether, trehalose-tetra{3-(meth)acryloyloxy-2-hydroxypropyl}ether, trehalose-penta{3-(meth)acryloyloxy-2-hydroxypropyl}ether, trehalose-hexa{3-(meth)acryloyloxy-2-hydroxypropyl}ether, trehalose-hepta{3-(meth)acryloyloxy-2-hydroxypropyl}ether and trehalose-octa{3-(meth)acryloyloxy-2-hydroxypropyl}ether.

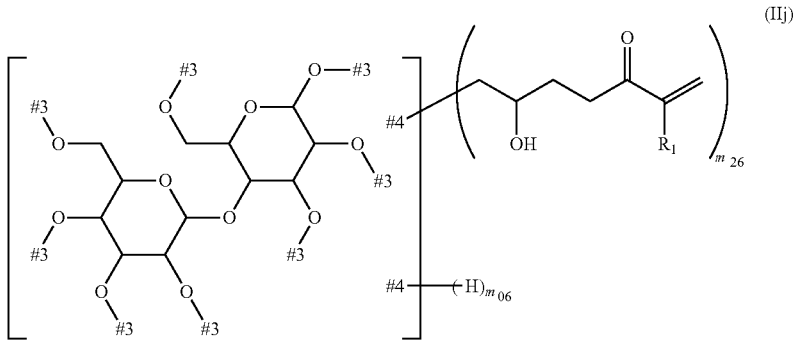

In the formula (IIj), $R_1$ represents a hydrogen atom or a methyl group; #3 and #4 represent bonding hands; and #3 and #4 are bonded together.

In the formula (IIj), $m_{28}$ is an integer of 2 to 8, and preferably an integer of 3 to 8; $m_{06}$ is an integer of 0 to 6; and $m_{28}+m_{06}=8$.

Examples of the compounds represented by the general formula (IIj) include lactose-tri{3-(meth)acryloyloxy-2-hydroxypropyl}ether, lactose-tetra{3-(meth)acryloyloxy-2-hydroxypropyl}ether, lactose-penta{3-(meth)acryloyloxy-2-hydroxypropyl}ether, lactose-hexa{3-(meth)acryloyloxy-2-hydroxypropyl}ether, lactose-hepta{3-(meth)acryloyloxy-2-hydroxypropyl}ether, lactose-octa{3-(meth)acryloyloxy-2-hydroxypropyl}ether, maltose-tri{3-(meth)acryloyloxy-2-hydroxypropyl}ether, maltose-tetra{3-(meth)acryloyloxy-2-hydroxypropyl}ether, maltose-penta{3-

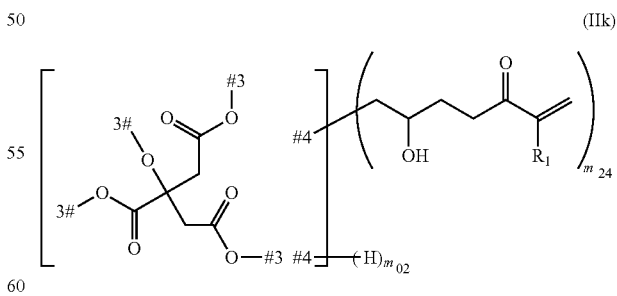

In the formula (IIk), $R_1$ represents a hydrogen atom or a methyl group; #3 and #4 represent bonding hands; and #3 and #4 are bonded together.

In the formula (IIk), $m_{24}$ is an integer of 2 to 4, and preferably an integer of 3 to 4; $m_{02}$ is an integer of 0 to 2, and preferably 0 or 1; and $m_{24}$ $m_{02}=4$.

Examples of the compounds represented by the general formula (IIk) include citric acid-tri{3-(meth)acryloyloxy-2-hydroxypropyl} ester and citric acid-mono{3-(meth)acryloyloxy-2-hydroxypropyl}ether-tri{3-(meth)acryloyloxy-2-hydroxypropyl} ester.

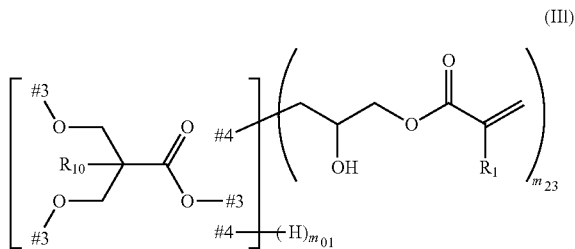
(III)

In the formula (III), $R_{10}$ is a hydrogen atom, a $C_{1-10}$ alkyl group, a $C_{3-10}$ cycloalkyl group, a phenyl group, a benzyl group, a hydroxyl group, hydroxymethyl or hydroxyethyl; $R_1$ represents a hydrogen atom or a methyl group; #3 and #4 represent bonding hands; and #3 and #4 are bonded together.

In the formula (III), $m_{23}$ is an integer of 2 to 3; $m_{01}$ is an integer of 0 or 1; and $m_{23}+m_{01}=3$. Preferably, $m_{23}$ and $m_{01}$ are such that $m_{23}$ represents 3 and $m_{01}$ represents 0.

Examples of the compounds represented by the general formula (III) include dimethylolacetic acid-di{3-(meth)acryloyloxy-2-hydroxypropyl}ether-mono{3-(meth)acryloyloxy-2-hydroxypropyl} ester, dimethylolpropionic acid-di{3-(meth)acryloyloxy-2-hydroxypropyl}ether-mono{3-(meth)acryloyloxy-2-hydroxypropyl} ester and dimethylolbutyric acid-di{3-(meth)acryloyloxy-2-hydroxypropyl}ether-mono{3-(meth)acryloyloxy-2-hydroxypropyl} ester.

Of the compounds represented by the general formulas (IIb) to (III), those compounds represented by the general formulas (IIb) to (IIf) are preferable, and those compounds represented by the general formulas (IIb) and (IIe) are more preferable.

The molecular weight of the compounds (II) is usually 100 to 30,000, preferably 200 to 10,000, and more preferably 300 to 5,000.

The compounds (II) may be used singly, or two or more may be used in combination.

The composition used to produce the monolayer films of the invention contains the compound (II). At least some of the molecules of the compound (II) may be reacted to form an oligomer in the composition. Here, the oligomer usually contains 2 to 20 repeating units derived from the compound (II).

The compounds (II) may be produced by a known method or a method that is deemed as known. Alternatively, the compounds (II) may be purchased from the market.

In the invention, the highly polar, crosslinkable polymerizable compound (II) has a specific structure that allows the hydrophilic compound (I) to attain increased solubility without being hindered from becoming enriched (concentrated) at a surface, as compared to when a conventional crosslinkable polymerizable compound (for example, any of crosslinkable polymerizable compounds described in literature such as WO 2007/064003 and WO 2012/014829) is used. By the finding of such a compound, it has become possible to dramatically enhance the transparency, while ensuring hydrophilicity, of a monolayer film which includes the crosslinked resin obtained by polymerizing the composition including the compound (I) and the compound (II).

In contrast to the great difficulties encountered in the conventional techniques, high effects in the satisfaction of high transparency in conjunction with hydrophilicity are now obtainable in the use of the hydrophilic compound (I), for example, the compound represented by the general formula (101) and the general formula (121), the compound represented by the general formula (101) and the general formula (122), the compound represented by the general formula (102) and the general formula (121), the compound represented by the general formula (102) and the general formula (122), the compound represented by the general formula (103) and the general formula (121), or the compound represented by the general formula (103) and the general formula (122). In particular, the obtainable effects are more significant when the compound used is one represented by the general formula (101) and the general formula (121), or one represented by the general formula (101) and the general formula (122).

[Additional Components]

The composition used to produce the monolayer films of the invention may contain additional components other than the compound (I) and the compound (II) as required.

Examples of the additional components include silica particles (V). The silica particles (V) enhance the leveling properties of the composition and impart matte effects (control the gloss).

In the composition, the silica particles (V) are usually present in the range of 0.00001 to 50 wt %, preferably in the range of 0.0001 to 30 wt %, and more preferably in the range of 0.001 to 20 wt %.

Examples of the additional components other than the silica particles (V) which may be added to the composition include such additives as polymerization initiators, polymerization accelerators, UV absorbers, hindered amine light stabilizers (HALSs), solvents, catalysts, infrared absorbers, radical scavengers, internal mold release agents, antioxidants, polymerization inhibitors, dyes, binders, surfactants, dispersants and leveling agents.

For the production of the monolayer films of the invention from the composition, the composition is polymerized. When the composition is polymerized with radiations such as UV lights, a photopolymerization initiator is added to the mixture. In the case of thermal polymerization, a thermal polymerization initiator is added.

Examples of the photopolymerization initiators include photo radical polymerization initiators, photo cationic polymerization initiators and photo anionic polymerization initiators. Of these photopolymerization initiators, photo radical polymerization initiators are preferable.

Examples of the photo radical polymerization initiators include IRGACURE 127 (manufactured by Ciba Specialty Chemicals, Inc.), IRGACURE 651 (manufactured by Ciba Specialty Chemicals, Inc.), IRGACURE 184 (manufactured by Ciba Specialty Chemicals, Inc.), DAROCUR 1173 (manufactured by Ciba Specialty Chemicals, Inc.), benzophenone, 4-phenylbenzophenone, IRGACURE 500 (manufactured by Ciba Specialty Chemicals, Inc.), IRGACURE 2959 (manufactured by Ciba Specialty Chemicals, Inc.), IRGACURE 907 (manufactured by Ciba Specialty Chemicals, Inc.), IRGACURE 369 (manufactured by Ciba Specialty Chemicals, Inc.), IRGACURE 1300 (manufactured by Ciba Specialty Chemicals, Inc.), IRGACURE 819 (manufactured by Ciba Specialty Chemicals, Inc.), IRGACURE 1800 (manufactured by Ciba Specialty Chemicals, Inc.), DAROCUR TPO (manufactured by Ciba Specialty Chemicals, Inc.), DAROCUR 4265 (manufactured by Ciba Specialty Chemicals, Inc.), IRGACURE OXE01 (manufactured by Ciba Specialty Chemicals, Inc.), IRGACURE OXE02 (manufactured by Ciba Specialty Chemicals, Inc.), ESACURE KT55 (manufactured by Lamberti S.P.A.), ESACURE ONE (manufactured by Lamberti S.P.A.), ESACURE KIP150 (manufactured by Lamberti S.P.A.), ESACURE KIP100F (manufactured by Lamberti S.P.A.), ESACURE KT37 (manufactured by Lamberti S.P.A.), ESACURE KTO46 (manufactured by Lamberti S.P.A.), ESACURE 1001M (manufactured by Lamberti S.P.A.), ESACURE KIP/EM (manufactured by Lamberti S.P.A.), ESACURE DP250 (manufactured by Lamberti S.P.A.), ESACURE KB1 (manufactured by Lamberti S.P.A.) and 2,4-diethylthioxanthone.

Of the above photo polymerization initiators, among others, IRGACURE 127 (manufactured by Ciba Specialty Chemicals, Inc.), IRGACURE 184 (manufactured by Ciba Specialty Chemicals, Inc.), DAROCUR 1173 (manufactured by Ciba Specialty Chemicals, Inc.), IRGACURE 500 (manufactured by Ciba Specialty Chemicals, Inc.), IRGACURE 819 (manufactured by Ciba Specialty Chemicals, Inc.), DAROCUR TPO (manufactured by Ciba Specialty Chemicals, Inc.), ESACURE ONE (manufactured by Lamberti S.P.A.), ESACURE KIP100F (manufactured by Lamberti S.P.A.), ESACURE KT37 (manufactured by Lamberti S.P.A.) and ESACURE KTO46 (manufactured by Lamberti S.P.A.) are preferable.

Examples of the photo cationic polymerization initiators include IRGACURE 250 (manufactured by Ciba Specialty Chemicals, Inc.), IRGACURE 784 (manufactured by Ciba Specialty Chemicals, Inc.), ESACURE 1064 (manufactured by Lamberti S.P.A.), CYRAURE UVI6990 (manufactured by Union Carbide Corp. Japan), ADEKA OPTOMER SP-172 (manufactured by ADEKA CORPORATION), ADEKA OPTOMER SP-170 (manufactured by ADEKA CORPORATION), ADEKA OPTOMER SP-152 (manufactured by ADEKA CORPORATION) and ADEKA OPTOMER SP-150 (manufactured by ADEKA CORPORATION).

Examples of the thermal polymerization initiators include:

ketone peroxides such as methyl isobutyl ketone peroxide and cyclohexanone peroxide;

diacyl peroxides such as isobutyryl peroxide, o-chlorobenzoyl peroxide and benzoyl peroxide;

dialkyl peroxides such as tris(t-butylperoxy)triazine and t-butylcumyl peroxide;

peroxyketals such as 2,2-bis(4,4-di-t-butylperoxycyclohexyl)propane and 2,2-di(t-butylperoxy)butane;

alkyl peresters such as α-cumyl peroxyneodecanoate, t-butyl peroxypivalate, 2,4,4-trimethylpentyl peroxy-2-ethylhexanoate, t-butyl peroxy-2-ethylhexanoate and t-butyl peroxy-3,5,5-trimethylhexanoate; and percarbonates such as di-3-methoxybutyl peroxydicarbonate, bis(4-t-butylcyclohexyl) peroxydicarbonate, t-butyl peroxyisopropyl carbonate and diethylene glycol bis(t-butyl peroxycarbonate).

The amount of the photopolymerization initiators and the thermal polymerization initiators is preferably in the range of 0.1 to 20 wt %, more preferably in the range of 0.5 to 10 wt %, and still more preferably in the range of 1 to 5 wt % relative to the total of the compounds (I) and (II).

The photopolymerization initiators may be used in combination with photopolymerization accelerators. Examples of the photopolymerization accelerators include 2,2-bis(2-chlorophenyl)-4,5'-tetraphenyl-2'H-<1,2'>biimidazolyl, tris(4-dimethylaminophenyl)methane, 4,4'-bis(dimethylamino) benzophenone, 2-ethylanthraquinone and camphorquinone.

To ensure that the inventive monolayer films used as, for example, antifouling materials or antifogging materials will not be denatured even by prolonged exposure to the outdoor, it is desirable to impart weather resistance to the composition used to produce the inventive monolayer films by the addition of a UV absorber and/or a hindered amine light stabilizer.

The UV absorbers are not particularly limited. Various UV absorbers may be used, with examples including benzotriazole UV absorbers, triazine UV absorbers, benzophenone UV absorbers, benzoate UV absorbers, propanedioate ester UV absorbers and oxanilide UV absorbers.

Examples of the UV absorbers include benzotriazole UV absorbers such as 2-(2H-benzotriazol-2-yl)-p-cresol, 2-(2H-benzotriazol-2-yl)-4-tert-butylphenol, 2-(2H-benzotriazol-2-yl)-4, 6-di-tert-butylphenol, 2-(2H-benzotriazol-2-yl)-4,6-bis(1-methyl-1-phenylethyl)phenol, 2-(2H-benzotriazol-2-yl)-4-(1,1,3,3-tetramethylbutyl)-6-(1-methyl-1-phenylethyl) phenol, 2-(2H-benzotriazol-2-yl)-4-(3-on-4-oxa-dodecyl)-6-tert-butyl-phenol, 2-{5-chloro(2H)-benzotriazol-2-yl}-4-(3-on-4-oxa-dodecyl)-6-tert-butyl-phenol, 2-{5-chloro(2H)-benzotriazol-2-yl}-4-methyl-6-tert-butyl-phenol, 2-(2H-benzotriazol-2-yl)-4,6-di-tert-pentylphenol, 2-{5-chloro (2H)-benzotriazol-2-yl}-4,6-di-tert-butylphenol, 2-(2H-benzotriazol-2-yl)-4-tert-octylphenol, 2-(2H-benzotriazol-2-yl)-4-methyl-6-n-dodecylphenol and methyl-3-{3-(2H-benzotriazol-2-yl)-5-tert-butyl-4-hydroxyphenyl} propionate/polyethylene glycol 300 reaction product; triazine UV absorbers such as 2-(4-phenoxy-2-hydroxy-phenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, TINUVIN 400 (trade name, manufactured by Ciba Specialty Chemicals, Inc.), TINUVIN 405 (trade name, manufactured by Ciba Specialty Chemicals, Inc.), TINUVIN 460 (trade name, manufactured by Ciba Specialty Chemicals, Inc.) and TINUVIN 479 (trade name, manufactured by Ciba Specialty Chemicals, Inc.); benzophenone UV absorbers such as 2-hydroxy-4-n-octoxybenzophenone; benzoate UV absorbers such as 2,4-di-tert-butylphenyl-3,5-di-tert-butyl-4-hydroxybenzoate; propanedioate ester UV absorbers such as {(4-methoxyphenyl)-methylene}-dimethyl propanedioate ester, HOSTAVIN PR-25 (trade name, manufactured by Clariant (Japan) K.K.) and HOSTAVIN B-CAP (trade name, manufactured by Clariant (Japan) K.K.); and oxanilide UV absorbers such as 2-ethyl-2'-ethoxy-oxanilide and Sanduvor VSU (trade name, manufactured by Clariant (Japan) K.K.). Of these UV absorbers, triazine UV absorbers tend to be preferable.

The hindered amine light stabilizers (abbreviated as HALSs) are a general term for compounds which usually have a 2,2,6,6-tetramethylpiperidine skeleton, and are broadly categorized according to molecular weight into low-molecular weight HALSs, medium-molecular weight HALSs, high-molecular weight HALSs and reactive HALSs. Examples of the hindered amine light stabilizers include TINUVIN 111FDL (trade name, (manufactured by Ciba Specialty Chemicals, Inc.), bis(1-octyloxy-2,2,6,6-tetramethyl-4-piperidyl) sebacate (TINUVIN 123 (trade name, manufactured by Ciba Specalty Chemicals, Inc.)), TINUVIN 144 (trade name, manufactured by Ciba Specialty Chemicals, Inc.), TINUVIN 292 (trade name, manufactured by Ciba Specialty Chemicals, Inc.), TINUVIN 765 (trade name, manufactured by Ciba Specialty Chemicals, Inc.), TINUVIN 770 (trade name, manufactured by Ciba Specialty Chemicals, Inc.), N,N'-bis(3-aminopropyl)ethylenediamine-2,4-bis[N-butyl-N-(1,2,2,6,6-pentamethyl-4-piperidyl)amino]-6-chloro-1,3,5-triazine condensate (CHIMASSORB 119FL (trade name, manufactured by Ciba Specialty Chemicals, Inc.)), CHIMASSORB2020FDL (trade name, manufactured by Ciba Specialty Chemicals, Inc.), dimethyl succinate-1-(2-hydroxyethyl)-4-hydroxy-2,2,6,6-tetramethyl piperidine polycondensate (CHIMASSORB 622LD (trade name, manufactured by Ciba Specialty Chemicals, Inc.)), poly[{6-(1,1,3,3-tetramethyl-butyl)amino-1,3,5-triazine-2,4-diyl}{(2,2,6,6-tetramethyl-4-piperidyl)imino}hexamethylene{(2,2,6,6-tetramethyllauryl-4-piperidyl)imino}] (CHIMASSORB 944FD (trade name, manufactured by Ciba Specialty Chemicals, Inc.)), Sanduvor 3050 Liq. (trade name, manufactured by Clariant (Japan) K.K.), Sanduvor 3052 Liq. (trade name, (manufactured by Clariant (Japan) K.K.), Sanduvor 3058 Liq. (trade name, manufactured by Clariant (Japan) K.K.), Sanduvor 3051 Powder. (trade name, manufactured by Clariant (Japan) K.K.), Sanduvor 3070 Powder. (trade name, manufactured by Clariant (Japan) K.K.), VP Sanduvor PR-31 (trade name, manufactured by Clariant (Japan) K.K.), HOSTAVIN N20 (trade name, manufactured by Clariant (Japan) K.K.), HOSTAVIN N24 (trade name, manufactured by Clariant (Japan) K.K.), HOSTAVIN N30 (trade name, manufactured by Clariant (Japan) K.K.), HOSTAVIN N321 (trade name, manufactured by Clariant (Japan) K.K.), HOSTAVIN PR-31 (trade name, manufactured by Clariant (Japan) K.K.), HOSTAVIN 845 (trade name, manufactured by Clariant (Japan) K.K.) and NYLOSTAB S-EED (trade name, manufactured by Clariant (Japan) K.K.).

The UV absorber and the hindered amine light stabilizer may be added in any amounts without limitation. The amount of the UV absorber is usually 0.1 to 20 wt %, and preferably 0.5 to 10 wt %, and the amount of the hindered amine light stabilizer is usually 0.1 to 10 wt %, preferably 0.5 to 5 wt %, and more preferably 1 to 3 wt % relative to the total of the compounds (I) and (II). These amounts of the UV absorber and the hindered amine light stabilizer ensure that the composition used to produce the inventive monolayer films will give monolayer films that exhibit markedly improved weather resistance. The UV absorber and the hindered amine light stabilizer added in amounts below the above ranges tend to produce only small effects in the enhancement of the weather resistance of the obtainable hydrophilic crosslinked resins, for example, monolayer films. On the other hand, adding the UV absorber and the hindered amine light stabilizer in amounts exceeding the above ranges may result in insufficient polymerization of the composition.

The composition which contains the compound (I) and the compound (II) and is used to produce the inventive monolayer films may contain a solvent in consideration of aspects such as workability during the fabrication of the monolayer films.

The solvents are not particularly limited as long as the composition can give a crosslinked resin having a hydrophilic surface. It is, however, not preferable to use solvents which have excessively strong interactions with the constituents present in the monomer composition in the invention, for example, solvents which can react or form salts with the constituents, or to use solvents having an excessively high boiling point, for example, solvents having a boiling point of above 200° C. For example, ethanolamine compounds having a hydroxyethylamino structure [NRaRb(CH$_2$CH$_2$OH): Ra and Rb are each independently hydrogen, a C$_{1-15}$ alkyl group or a CH$_2$CH$_2$OH group] are prone to interact with the hydrophilic groups present in the compound (I), for example, the anionic hydrophilic groups such as the sulfonate groups to form a salt or a pseudo salt, and are difficult to evaporate. When an attempt is made to remove such a solvent from the mixture applied, the solvent barely moves to the surface in contact with the air and tends to remain in the inside. Consequently, the hydrophilic groups present in the compound (I) tend to be prevented from being enriched (concentrated) at the surface of the coating in contact with the air. Thus, such ethanolamine compounds are not suited for use as the solvents. Examples of such compounds include ethanolamine, diethanolamine, triethanolamine, N-ethyl-ethanolamine, N-(2-ethylhexyl)ethanolamine, N-butyl-diethanolamine, N-hexyl-diethanolamine, N-lauryl-diethanolamine and N-cetyl-diethanolamine.

In the invention, appropriate solvents except the solvents described above may be used in consideration of aspects such as the solubility of the compound (I) and the compound (II). The invention can use a greater variation of solvents than is possible for conventional compositions. When, for example, a conventional composition (such as one described in WO 2007/064003 or WO 2012/014829) is diluted relatively thinly with a solvent (when the composition is used in a low solid content) and the mass solvent consists solely of a low-polarity solvent, a uniform solution (composition) cannot often be obtained due to the separation of a hydrophilic compound (corresponding to the compound (I) in the invention) or a crosslinkable polymerizable compound (corresponding to the compound (II) in the invention). Direct application of such a nonuniform solution to a substrate only gives a nonuniform coating (for example, a film) having poor transparency which cannot often be used in applications where, for example, a certain level of transparency is required.

In contrast, the solubility of the compound (I) in the inventive composition is enhanced by the incorporation of the specific compound (II) having three or more hydroxyl groups and two or more functional groups with a polymerizable carbon-carbon double bond. Consequently, even a solvent having relatively low polarity can be used, and also the amount of the solvent used can be reduced.

The solubility parameter (the SP value) σ (cal/cm$^3$)$^{1/2}$ of the solvents is preferably not less than 8.4 (cal/cm$^3$)$^{1/2}$, more preferably not less than 9.0 (cal/cm$^3$)$^{1/2}$, still more preferably not less than 9.3 (cal/cm$^3$)$^{1/2}$, and even more preferably not less than 9.5 (cal/cm$^3$)$^{1/2}$.

Examples of suitable solvents include methanol, ethanol, 1-propanol, isopropanol (IPA), 1-butanol, isobutanol, 1-pentanol (1-amyl alcohol), isopentanol, 2-pentanol, 3-pentanol, cyclohexanol, 1-methoxy-2-propanol (methoxypropanol), 2-methoxy-1-propanol, 2-methoxy-1-ethanol (methoxyethanol), 2-isopropoxy-1-ethanol, acetonitrile and water.

Of these solvents, primary alcohols having an SP value of not less than 9.0 (cal/cm$^3$)$^{1/2}$ such as methanol, ethanol, 1-propanol, 1-butanol and 1-pentanol (1-amyl alcohol), and alkoxy alcohols having an SP value of not less than 9.0 (cal/cm$^3$)$^{1/2}$ such as 1-methoxy-2-propanol (methoxypropanol), 2-methoxy-1-ethanol (methoxyethanol) and 2-isopropoxy-1-ethanol are more preferable.

The solubility parameter (the SP value) can be easily calculated by a simplified calculation method described below.

Equations for calculating solubility parameter σ
1) Latent heat of vaporization per 1 mol $Hb=21\times(273+Tb)$ (unit: cal/mol),$Tb$: boiling point (° C.)

2) Latent heat of vaporization per 1 mol at 25° C.

$H25 = Hb \times \{1 + 0.175 \times (Tb-25)/100\}$ (unit: cal/mol),$Tb$: boiling point (° C.)

3) Intermolecular binding energy E=H25−596 (unit: cal/mol)
4) Intermolecular binding energy per 1 ml (cm$^3$) of solvent $E1 = E \times D/Mw$ (unit: cal/cm$^3$),$D$: density (g/cm$^3$),MW: molecular weight 5) Solubility parameter (SP value) $\sigma = (E1)^{1/2}$ (unit: (cal/cm$^3$)$^{1/2}$)

The amount of the solvent to be added to the inventive composition may be determined appropriately in consideration of aspects such as properties of hydrophilic cross linked resins, for example, monolayer films obtained according to the invention, and the economic efficiency.

The solvent is usually used in such an amount that the concentration of the solids in the composition (the total of the compound (I), the compound (II), the optional silica (V) and the additives) (solids/(solids+solvent)×100) will be 1 wt % or above, preferably 10 to 90 wt %, more preferably 20 to 80 wt %, and still more preferably 30 to 70 wt %.

Where necessary, additives other than those described hereinabove may be added to the composition. For example, the addition of a surfactant results in a hydrophilic crosslinked resin which has the hydrophilic groups enriched (concentrated) at a surface thereof. Thus, the invention increases the easiness and the options of materials in the manufacturing of crosslinked resin monolayer films having high hydrophilicity and high transparency as well as highly hydrophilic stacks including such monolayer films over the conventional techniques.

For example, additives such as titanium oxides, metals and metal oxides may be added to the inventive composition for purposes such as enhancing the mechanical strength and thermal strength of the obtainable hydrophilic crosslinked resins, and for imparting properties such as photoresponsive properties and bactericidal properties. For purposes such as increasing the refractive index of the obtainable hydrophilic crosslinked resins, sulfur-containing compounds may be added. For purposes such as imparting bactericidal properties and antibacterial properties, salts of metals such as silver and lithium, and such materials as iodine and iodonium salts may be added to the composition. The amount of these additives may be determined appropriately in accordance with the purpose, but is usually in the range of 0.01 to 200 wt %, and preferably in the range of 0.1 to 100 wt % relative to the total of the compound (I) and the compound (II).

When the composition of the invention contains the solvent described hereinabove, it is preferable that the coating of the composition applied onto an object such as a substrate be treated by heating or the like to sufficiently remove the solvent before the polymerization described later is performed. If the removal of the solvent from the composition is insufficient, the hydrophilic groups derived from the compound (I) (at least one type of hydrophilic groups selected from anionic hydrophilic groups, cationic hydrophilic groups and hydroxyl groups) are not allowed to move efficiently to the surface of the coating in contact with the air. As a result, the properties such as the hydrophilicity of the obtainable hydrophilic crosslinked resins tend to be decreased. Even if the hydrophilic groups have successfully moved to the surface of the coating in contact with the air, the residual solvent in the composition exhibits a repelling interaction with the air (which is hydrophobic) present on the surface in contact with the air so as to tend to facilitate the movement of the hydrophilic groups toward the inside of the coating. As a result, the obtainable hydrophilic crosslinked resins, for example, monolayer films often have an insufficient enrichment of the hydrophilic groups at the surface thereof in contact with the air, and also exhibit poor hydrophilicity at times. Further, the adhesion with respect to the substrate tends to be decreased. Thus, more favorable results tend to be obtained with decreasing amount of the residual solvent present in the composition immediately before the polymerization. The amount is usually not more than 10 wt %, preferably not more than 5 wt %, more preferably not more than 3 wt %, and still more preferably not more than 1 wt %.

The temperature during the removal of the solvent may be determined appropriately, but is usually in the range of room temperature to 200° C., preferably in the range of 30 to 150° C., and more preferably in the range of 40 to 120° C.

The removal of the solvent from the composition may be performed for an appropriately determined time. In consideration of productivity, a shorter time tends to be preferable. For example, the solvent removal is usually performed for not more than 30 minutes, preferably not more than 10 minutes, preferably not more than 5 minutes, more preferably not more than 3 minutes, and still more preferably not more than 2 minutes. The solvent removal may take place in the air atmosphere or in an inert gas such as nitrogen. An atmosphere having a lower humidity tends to be more preferable for reasons such as that the obtainable hydrophilic crosslinked resins (for example, monolayer films) are free from deteriorations in appearance (such as the occurrence of orange peels, and a decrease in transparency). Specifically, the humidity in the atmosphere is preferably not more than 80%, more preferably not more than 65%, and still more preferably not more than 55%.

When the solvent is removed by the application of wind, the wind speed is preferably not more than 30 m/sec, more preferably in the range of 0.1 to 30 m/sec, still more preferably in the range of 0.2 to 20 m/sec, and particularly preferably in the range of 0.3 to 10 m/sec.

The pressure during the solvent removal is not particularly limited. Normal pressure or a reduced pressure is relatively preferable. A slightly increased pressure may also be used.

A hydrophilic crosslinked resin, for example, a monolayer film according to the present invention can be obtained by applying the inventive composition onto an object such as a substrate and polymerizing the composition. The polymerization method is not particularly limited. For example, the composition may be polymerized by heat or radiation, or by both in combination.

The polymerization may be performed in air atmosphere. However, the polymerization time can be advantageously reduced by performing the polymerization in an inert gas atmosphere such as nitrogen.

When the polymerization involves heating, a thermal radical generator such as an organic peroxide is usually added to the composition and the mixture is heated at a temperature in the range of room temperature to 300° C.

In the case of radiation polymerization, an energy ray having a wavelength in the range of 0.0001 to 800 nm can be used as the radiation. Such radiations are categorized into α-rays, β-rays, γ-rays, X-rays, electron beams, UV lights and visible lights. An appropriate radiation may be selected in accordance with the chemical composition of the mixture. Of the radiations, UV lights are preferable. The output peak of the UV lights is preferably in the range of 200 to 450 nm, more preferably in the range of 230 to 445 nm, still more preferably in the range of 240 to 430 nm, and particularly preferably in the range of 250 to 400 nm. The use of UV lights having an output peak in the above range is advantageous in that defects such as yellowing and thermal deformation during the polymerization are remedied and the polymerization can be completed in a relatively short time even when the composition contains the UV absorber.

When the composition contains the UV absorber and/or the hindered amine stabilizer, it is preferable to use UV lights having an output peak in the range of 250 to 280 nm or 370 to 430 nm.

In order to prevent the radiation polymerization of the composition from being inhibited by oxygen, the polymerization may be performed in such a manner that after the composition is applied onto an object such as a substrate and optionally the coating is dried as required, a covering material (such as a film) is applied onto the coating layer and thereafter the covered coating layer is irradiated. The coating layer is desirably covered with the covering material tightly so that air (oxygen) will not be entrapped between the coating layer and the covering material. By blocking oxygen, for example, the amount of the (photo)polymerization initiator and the radiation dose can be reduced at times.

The covering materials are not particularly limited, and various materials can be used in various forms as long as oxygen can be blocked. Films are preferable in terms of handling. Of the films, transparent films allowing for easy radiation polymerization are preferable. The thickness of the films is usually in the range of 3 to 200 μm, preferably 5 to 100 μm, and more preferably 10 to 50 μm.

Examples of the film materials suitably used as the covering materials include vinyl alcohol polymers such as polyvinyl alcohols (PVAs) and ethylene.vinyl alcohol copolymers, polyacrylamides, polyisopropylacrylamides, polyacrylonitriles, polycarbonates (PCs), polymethyl methacrylates (PMMAs), polyethylene terephthalates (PETs), polystyrenes (PSs) and biaxially oriented polypropylenes (OPPs).

Electron beams in the range of 0.01 to 0.002 nm are preferable as the radiations because the polymerization can be completed in a short time, although such apparatuses are expensive.

The monolayer film obtained as described above that includes the hydrophilic crosslinked resin of the invention usually has a gradient (a ratio of anion concentrations) (Sa/Da) of not less than 1.1, preferably not less than 1.2, more preferably not less than 1.3, and still more preferably not less than 1.5 wherein Sa is the surface concentration of anionic hydrophilic groups and Da is the deep concentration of the hydrophilic groups at ½ of the thickness of the monolayer film.

The monolayer film of the invention is usually disposed as a coating on at least one surface of a substrate and contains the hydrophilic groups described above. In the monolayer film, the hydrophilic groups are distributed from a deep portion near the substrate to the surface of the film. In particular, the concentration distribution (the gradient (the ratio of the concentrations of hydrophilic groups) (Sa/Da)) is such that the concentration is higher on the top surface of the monolayer film in contact with the air.

The reason for the occurrence of such a distribution is probably because when an energy for polymerization such as heat or a radiation is applied to the composition spread on an object such as a substrate, the at least one type of hydrophilic groups selected from anionic hydrophilic groups, cationic hydrophilic groups and hydroxyl groups are self-assembled at the surface in contact with the air and the crosslinked resin monolayer film is formed after the formation of such a self-assembly.

Because the hydrophilic groups are present in a high concentration on the surface, the monolayer film including the inventive crosslinked resin exhibits excellent properties such as antifogging properties, antifouling properties or self-cleaning properties, and antistatic properties or anti-dust properties.

The gradient (the ratio of the concentrations of hydrophilic groups) is determined by a process in which a prescribed sample of the monolayer film is cut at a bevel, the concentrations of the anionic hydrophilic groups (such as, for example, sulfonate groups, carboxyl groups and phosphate groups) are measured with respect to the surface of the monolayer film in contact with the air and the point at ½ of the thickness of the monolayer film with use of a time-of-flight secondary ion mass spectrometer (TOF-SIMS), and the ratio of the (relative) intensities of the fragment ions is calculated.

The monolayer film including the inventive crosslinked resin usually has a water contact angle of not more than 50°, preferably not more than 30°, more preferably not more than 20°, and still more preferably not more than 10°.

With this water contact angle, the monolayer film exhibits high hydrophilicity and serves as an excellent hydrophilic material which is highly compatible (wettable) with water. Thus, the monolayer films are useful as, for example, antifogging materials, antifogging films (hereinafter, also referred to as antifogging coats), antifouling materials, antifouling films or self-cleaning coats, and antistatic materials, antistatic films or anti-dust coats. When, for example, used as an anti fogging coat, the film allows water droplets to spread on the surface to form a water film, thus achieving excellent antifogging effects. When used as a self-cleaning coat, the film allows water to penetrate into between the dirt and the coating surface to lift and remove the dirt, thus achieving excellent antifouling effects. Further, the capability of the hydrophilic monolayer film to allow water to spread leads to an increased evaporation area and thus provides an enhanced evaporation speed, namely, quick drying.

Because the monolayer films of the invention are enriched with (have a higher concentration of) the hydrophilic groups at the surface, the films attain higher antistatic properties than conventional hydrophilic films having no such enrichment and are useful also in applications such as antistatic materials, antistatic films or anti-dust coats.

When the water contact angle is not more than 30°, preferably not more than 20°, and more preferably not more than 10°, the monolayer films including the crosslinked resins of the invention are particularly suited for use as antifogging materials, antifouling materials, quick-dry materials and antistatic materials. The water contact angle is usually 0° or above.

The thickness of the hydrophilic crosslinked resins of the invention, typically the monolayer films (copolymers) may be determined appropriately in accordance with the applications, but is usually in the range of 0.0001 to 500 μm, preferably 0.05 to 500 μm, more preferably 0.1 to 300 μm, still more preferably 0.5 to 100 μm, further preferably 1 to 50 μm, and particularly preferably 2 to 30 μm.

The hydrophilic crosslinked resins of the invention, for example, monolayer films may be formed by any methods without limitation. For example, the crosslinked resins can be formed by applying the composition onto a surface of a substrate, optionally drying the wet film, and thereafter polymerizing the composition.

Examples of the substrates include substrates made of inorganic materials such as glasses, silicas, metals and metal oxides; substrates made of organic materials such as polymethyl methacrylates (PMMAs), polycarbonates, polyethylene terephthalates, polyacetyl celluloses (TACs), acrylonitrile.butadiene.styrene copolymers (ABSs), polyethylenes, polypropylenes, polystyrenes, polyurethane resins, epoxy resins, vinyl chloride resins, silicone resins, papers and pulps; organic inorganic substrates such as SMCs and BMCs which include composites of unsaturated polyester resins, fillers such as calcium carbonate, and such materials as glass fibers; and substrates having a cured coating layer in which a coating is formed on the surface of substrates made of any of the above inorganic materials, organic materials and organic inorganic composite materials.

In order to activate the substrate surface as required, the surface of these substrates may be subjected to physical or chemical treatments such as corona treatment, ozone treatment, low-temperature plasma treatment using a gas such as oxygen gas or nitrogen gas, glow discharge treatment, oxidation treatment with agents such as chemicals, and flame treatment. Instead of or in addition to such a treatment, the substrate surface may be subjected to primer treatment, undercoating treatment or anchor coating treatment.

Examples of the coating agents used in the primer treatment, the undercoating treatment and the anchor coating treatment include coating agents containing, as the main components of vehicles, resins such as polyester resins, polyamide resins, polyurethane resins, epoxy resins, phenolic resins, (meth)acrylic resins, polyvinyl acetate resins, polyolefin resins including polyethylenes and polypropylenes as well as copolymers thereof or modified resins thereof, and cellulose resins. The coating agents may be any of solvent-based coating agents and aqueous coating agents.

Of the coating agents, preferred coating agents are:

modified polyolefin coating agents, ethyl vinyl alcohol coating agents, polyethyleneimine coating agents, polybutadiene coating agents, polyurethane coating agents;

polyester polyurethane emulsion coating agents, polyvinyl chloride emulsion coating agents, urethane acrylic emulsion coating agents, silicon acrylic emulsion coating agents, vinyl acetate acrylic emulsion coating agents, acrylic emulsion coating agents;

styrene-butadiene copolymer latex coating agents, acrylonitrile-butadiene copolymer latex coating agents, methyl methacrylate-butadiene copolymer latex coating agents, chloroprene latex coating agents, rubber latex coating agents containing polybutadiene latex, polyacrylate ester latex coating agents, polyvinylidene chloride latex coating agents, polybutadiene latex coating agents, and coating agents which include latexes or dispersions resulting from the carboxylic acid modification of the resins present in the above latex coating agents.

For example, these coating agents may be applied by methods such as gravure coating methods, reverse roll coating methods, knife coating methods and kiss-roll coating methods. The mass of coating on the substrate is usually 0.05 g/m² to 10 g/m² on dry basis.

Of these coating agents, polyurethane coating agents are more preferable. The polyurethane coating agents have a urethane bond in the main chain or a side chain of the resin contained in the coating agents. For example, the polyurethane coating agents contain a polyurethane obtained by reacting a polyol such as a polyester polyol, a polyether polyol or an acrylic polyol, with an isocyanate compound.

Of the polyurethane coating agents, excellent adhesion is advantageously provided by polyurethane coating agents obtained by mixing a polyester polyol such as a condensed polyester polyol or a lactone-based polyester polyol with an isocyanate compound such as tolylene diisocyanate, hexamethylene diisocyanate or xylene diisocyanate.

The polyol compounds and the isocyanate compounds may be mixed with each other by any methods without limitation. The mixing ratio is not particularly limited. When, however, the amount of the isocyanate compound is excessively small, curing failure may be caused. Thus, the equivalent ratio of the OH groups of the polyol compound to the NCO groups of the isocyanate compound is preferably in the range of 2/1 to 1/40.

The substrates in the invention may have a surface that has been treated by the aforementioned surface activation.

The substrate whose surface is coated with a monolayer film including the crosslinked resin of the invention may be used as a stack including the substrate and the monolayer film. For example, the monolayer film is an antifogging film, an antifouling film, a quick-dry film or an antistatic film. That is, the stack includes the substrate coated with such an antifogging film, antifouling film, quick-dry film or antistatic film.

When the substrate is a film, a pressure-sensitive adhesive layer described later may be provided on, for example, the surface of the substrate on which the monolayer film of the invention is not disposed. Further, a release film may be provided on the surface of the pressure-sensitive adhesive layer. The pressure-sensitive adhesive layers that are laminated on the surface of the substrate films opposite to the inventive monolayer films allow users to attach easily the stack films as antifogging films or antifouling films onto objects such as glasses, bathroom mirrors or the like, surfaces of display devices such as displays and televisions, information boards such as signboards, advertisements and guideboards, signs such as railroad signs and traffic signs, exterior walls of buildings, and window glasses.

The pressure-sensitive adhesives used in the pressure-sensitive adhesive layers are not particularly limited, and known pressure-sensitive adhesives may be used. Examples of the pressure-sensitive adhesives include acrylic pressure-sensitive adhesives, rubber pressure-sensitive adhesives, vinyl ether polymer pressure-sensitive adhesives and silicone pressure-sensitive adhesives. The thickness of the pressure-sensitive adhesive layers is usually in the range of 2 to 50 μm, and preferably in the range of 5 to 30 μm.

In the inventive monolayer film and a stack including the monolayer film, the surface of the monolayer film in contact with the air may be covered with a covering material. The covering material disposed on the single monolayer film or the monolayer film constituting a stack can prevent the monolayer film from being scratched or fouled during actions such as transportation, storage and laying out.

As described hereinabove, a covering material is provided in close contact with the coating during the formation of the inventive monolayer film on an object such as a substrate by radiation polymerization. This covering material may be continuously used as the covering material for the above purposes.

Examples of the film materials suitably used as the covering materials include vinyl alcohol polymers such as polyvinyl alcohols (PVAs), polyacetyl celluloses (TACs) and ethylene.vinyl alcohol copolymers, polyacrylamides, polyisopropylacrylamides, polyacrylonitriles, polycarbonates (PCs), polymethyl methacrylates (PMMAs), polyethylene terephthalates (PETs), polyacrylonitrile.butadiene.styrene copolymers (ABSs), polystyrenes (PSs) and biaxially oriented polypropylenes (OPPs).

The composition which includes the compound (I) and the compound (II) may be polymerized in molds having various shapes. In this manner, crosslinked resins such as monolayer films and articles can be formed in various shapes.

The hydrophilic crosslinked resins obtained in accordance with the invention, for example, monolayer films, and stacks including the monolayer films can be suitably used as such materials as antifogging materials, antifouling materials, quick-dry materials and antistatic materials.

Coatings formed of the crosslinked resins, for example, monolayer films and stacks, can be used to impart quick-dry properties, hydrophilicity, antifogging properties and antifouling properties to, for example, vehicles and vehicle materials; ships and ship materials; aircraft and aircraft materials; buildings and building materials; windows, mirrors, exterior walls, exteriors, bodies, wheels, interior walls, interiors and floors in structures such as vehicles, ships, aircraft and buildings; furniture and furniture materials; utilities such as pipes and wires, and materials for such utilities; fiber products such as garments and cloths; household equipment such as sinks, bathrooms, restrooms, ventilation fans and kitchens, and materials for such equipment; electric appliances such as washing machines, dish dryers, refrigerators, microwaves, ovens and shavers, and materials for such appliances; displays and display materials; optical products such as optical films, optical disks, optical lenses, eyeglass lenses, contact lenses and goggles; dental materials such as artificial teeth and dentures; lighting items such as lamps and lights, and materials for such items; heat exchanger components such as cooling fins, and materials for such components; record printing materials such as photoresists and inkjet recording plates; cosmetic containers and materials for such containers; reflective materials such as reflective films and reflective boards; sound insulating boards located at places such as expressways; display materials; printing or typing primers; other primers; flat panels; touch panels; sheets; films; tapes; and transparent materials such as transparent resins and glasses. Further, the coatings can impart anti-condensation properties and antistatic properties.

EXAMPLES

Hereinbelow, the present invention will be described in further detail by discussions such as examples. The scope of the invention is not limited to such examples.

Properties of films in the invention were evaluated as described below.

<Measurement of Ratio of Concentrations of Hydrophilic Groups>

A sample was cut at a bevel as illustrated in the sample preparation in FIG. 1. With use of a time-of-flight secondary ion mass spectrometer (TOF-SIMS), the sample was analyzed with respect to fragment ions of a hydrophilic compound having hydrophilic groups, namely, sulfonate groups, carboxyl groups, phosphate groups, quaternary ammonium groups and hydroxyl groups. Specifically, the concentration of the fragment ions derived from the hydrophilic compound that were present at the top surface was measured (Sa). Further, the concentration of the fragment ions that were present at half the thickness was measured (Da). The concentration of the hydrophilic groups derived from the hydrophilic compound that were present at the top surface of the film in contact with the air was expressed as a ratio to the concentration of the hydrophilic groups that were present at the middle point between the bottom surface and the top surface of the film. In this manner, the gradient (Sa/Da) of hydrophilic group concentration was determined.

(Analyzer and Measurement Conditions)
TOF-SIMS: TOF-SIMS5 manufactured by ION.TOF
Primary ions: $Bi_3^{2+}$ (accelerating voltage 25 kV)
Measurement area: 400 μm$^2$ In the measurement, a neutralizing gun for correcting electric charges was used.

(Preparation and Analysis of Sample)

As illustrated in FIG. 1, a sample in which a coating layer 20 was disposed on a surface of a substrate 10 was cut at a bevel accurately in a cutting direction 30. Thereafter, an approximately 10×10 mm$^2$ piece was cut out, and a mesh was placed on the measurement surface. The sample was then fixed to a sample holder, and the concentration of hydrophilic groups was measured with the time-of-flight secondary ion mass spectrometer (TOF-SIMS) with respect to a surface 40 of the coating layer in contact with the air and to an inner portion 50 of the coating layer which was located inside the film (at ½ of the film thickness, a surface exposed at the inside of the coating layer in contact with the substrate 10).

(Evaluation)

The evaluation was made using the equation described below. The ion concentrations at the respective measurement points were relative intensities (relative to the total of the detected ions).

Sa/Da (ratio of concentrations of hydrophilic groups, gradient)=Concentration of hydrophilic groups at surface 40 of coating layer/Concentration of hydrophilic groups at ½ of film thickness of coating layer 20

<Measurement of Water Contact Angle>

The water contact angle was measured with respect to 3 sites for each sample with use of water contact angle meter CA-V manufactured by Kyowa Interface Science Co., Ltd. The water contact angles measured were averaged.

<Measurement of Haze>

The haze was measured with respect to 4 sites for each sample with use of haze meter NDH2000 manufactured by NIPPON DENSHOKU INDUSTRIES CO., LTD. The haze values measured were averaged.

<Evaluation of Adhesion>

The adhesion was evaluated by JIS K5400, crosscut adhesion test.

<Evaluation of Antifouling Properties>

The surface was marked with oil-based marker "Mackee Gokuboso (ultrafine)" (black, code: MO-120-MC-BK) manufactured by ZEBRA CO., LTD. Water droplets were dropped on the marked surface, allowed to stand for 30 seconds, and wiped with tissue paper. The antifouling properties were evaluated as ⊙ when the mark had been lifted by water before wiping and could be easily removed, as ○ when the mark was cleanly removed, as Δ when the mark partially remained, and as x when the mark could not be wiped off.

<Evaluation of Resistance to Breath Fogging>

The resistance to breath fogging was evaluated to be ○ when the surface did not become fogged with breath, and x when the surface became fogged with breath.

Example 1

Preparation Example 1: Preparation of 10 wt % Compound (I)

With a homomixer (ROBOMIX (registered trademark) S-model manufactured by PRIMIX Corporation), 10 g of sodium styrenesulfonate (hereinafter, referred to as STS-Na), 30 g of water and 60 g of 1-methoxy-2-propanol (hereinafter, referred to as PGM) were mixed together at 15000 rpm for 3 minutes to give an STS-Na mixture liquid having a solid concentration of 10 wt %.

(Preparation of Coating Composition 1)

A coating composition 1 having a solid concentration of 39 wt % was prepared according to the formulation shown in Table 1 below.

TABLE 1

Coating composition 1

| Materials | Amount (g) | Concentration (wt %) | Remarks |
|---|---|---|---|
| 10% STS-Na | 70.0 | 24.7% | Prep. Ex. 1, Compound (I) |
| EA-5722 | 100.0 | 35.3% | Compound (II) |
| DAROCUR 1173 (BASF) | 3.0 | 1.1% | Polymerization initiator |
| PGM: 1-methoxy-2-propanol | 111.0 | 38.9% | Solvent |
| Total | 283.0 | 100.0% | |
| | | Solid concentration (wt %) = 39% | |

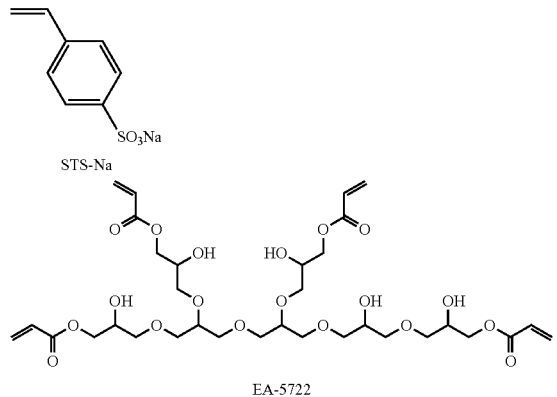

STS-Na

EA-5722

(Application to Substrate and UV Irradiation)

The coating composition 1 was applied onto a polycarbonate plate (size: 100 mm×100 mm, manufactured by Takiron Co., Ltd., hereinafter referred to as PC plate) with a bar coater #07. The coating was dried with a hot air dryer at 55° C. for 3 minutes and was irradiated with UV (electrodeless discharge lamp, H valve 240 W/cm, irradiation distance 70 mm, conveyer speed 10 m/min (intensity 170 mW/cm$^2$, accumulated dose 130 mJ/cm$^2$, measured with UIT-150 manufactured by USHIO INC.)) to form, on the PC plate, a 3 μm thick monolayer film which included the crosslinked resin having a hydrophilic surface. Thereafter, the surface of the film was washed with running water and was dried with an air gun. An evaluation sample was thus fabricated. The sample was evaluated by the properties evaluation methods described hereinabove. The gradient of sulfonate group concentration (Sa/Da) in the monolayer film obtained was 2.3. The other evaluation results are shown in Table 2.

Examples 2 to 5, Reference Example 1 and Comparative Examples 1 to 5

A coating composition was prepared, applied onto a substrate and UV irradiated to form a monolayer film on the PC plate, and the surface of the film was washed with running water and dried in the same manner as in Example 1 except that the amount in which STS-Na was added and the type of the compound (II) were changed as described in Table 2 below. The evaluation sample thus obtained was evaluated by the properties evaluation methods described hereinabove. The evaluation results are shown in Table 2.

TABLE 2

| | Compound (I) | | Compound (II) or crosslinking monomer other than compounds (II) | | Appearance | Water contact angle (°) | Haze (%) | Remarks |
|---|---|---|---|---|---|---|---|---|
| Ex. 1 | STS-Na | 7.0 g | EA-5722 | 100 g | Transparent | 17 | 1.1 | |
| Ex. 2 | STS-Na | 7.0 g | EA-5324 | 100 g | Transparent | 26 | 0.1 | |
| Ex. 3 | STS-Na | 6.0 g | EA-5323 | 100 g | Transparent | 22 | 1.7 | |
| Ex. 4 | STS-Na | 5.0 g | EA-5720 | 100 g | Transparent | 28 | 0.8 | |
| Ex. 5 | STS-Na | 5.0 g | EA-5721 | 100 g | Transparent | 25 | 3.4 | |
| Ref. Ex. 1 | STS-Na | 5.0 g | 80-MFA | 100 g | Whitened | 25 | 17 | Transparency decreased. |
| Comp. Ex. 1 | STS-Na | 5.0 g | A-BPE-10 | 100 g | Whitened | 67 | 20 | Hydrophilicity and transparency decreased. |
| Comp. Ex. 2 | STS-Na | 5.0 g | A-BPE-30 | 100 g | Whitened | 49 | 13 | Hydrophilicity and transparency decreased. |
| Comp. Ex. 3 | STS-Na | 5.0 g | A-GLY-9E | 100 g | Whitened | 59 | 27 | Hydrophilicity and transparency decreased. |
| Comp. Ex. 4 | STS-Na | 5.0 g | ATM-35E | 100 g | Whitened | 48 | 10 | Hydrophilicity and transparency decreased. |
| Comp. Ex. 5 | STS-Na | 5.0 g | PE-4A | 100 g | Whitened | 42 | 41 | Hydrophilicity and transparency decreased. |

TABLE 2-continued
| Compound (I) | Compound (II) or crosslinking monomer other than compounds (II) | Appearance | Water contact angle (°) | Haze (%) | Remarks |
|---|---|---|---|---|---|
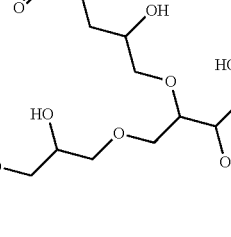
EA-5324
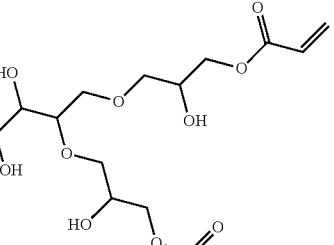
EA-5323
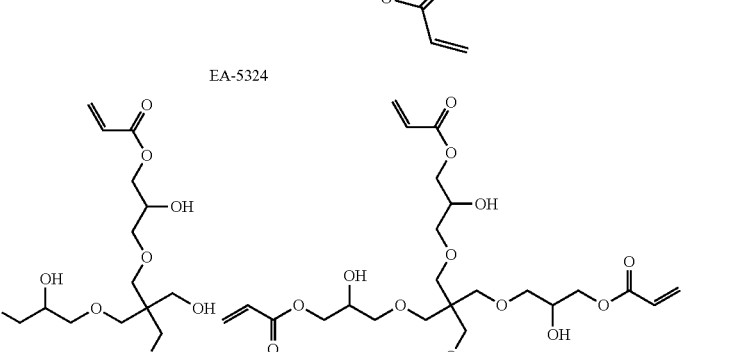
EA-5720
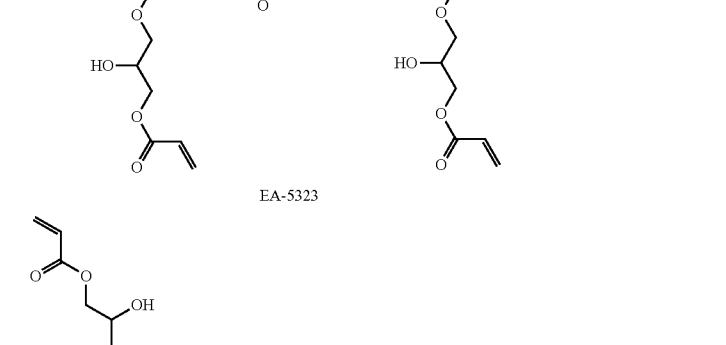
EA-5721
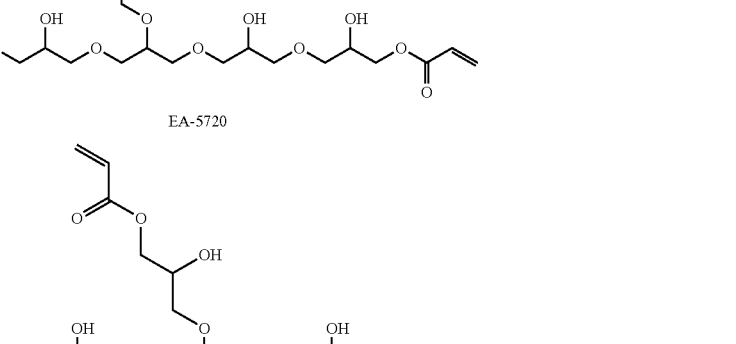
80-MFA TABLE 2-continued

| Compound (I) | Compound (II) or crosslinking monomer other than compounds (II) | Appearance | Water contact angle (°) | Haze (%) | Remarks |
|---|---|---|---|---|---|

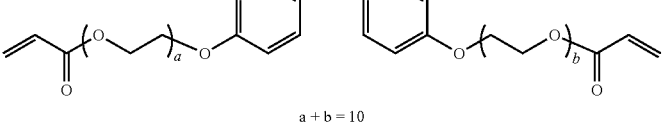

a + b = 10
A-BPE-10

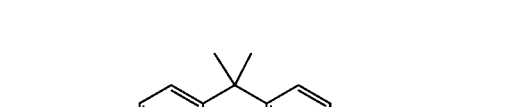

a + b = 30
A-BPE-30

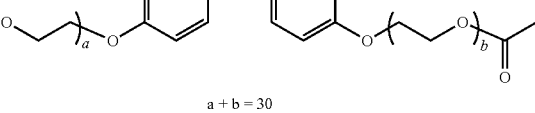

A-GLY-9E

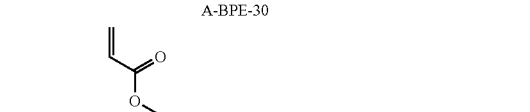

a + b + c + d = 35
ATM-35E

PE-4A

Examples 6 to 8 and Reference Example 2

A coating composition was prepared, applied onto a substrate and UV irradiated to form a monolayer film on the PC plate, and the surface of the film was washed with running water and dried in the same manner as in Example 1 except that the amount in which STS-Na was added was changed as described in Table 3 below and the type of the compound (II) was changed as described in Table 3 below (Examples 6 to 8) or the compound (II) was replaced by a crosslinking monomer other than the compounds (II) (Reference Example 2). The evaluation sample thus obtained was evaluated by the properties evaluation methods described hereinabove. The evaluation results are shown in Table 3.

TABLE 3

| | Compound (I) | Compound (II) or crosslinking monomer other than compounds (II) | | Appearance | Water contact angle (°) | Haze (%) | Remarks |
|---|---|---|---|---|---|---|---|
| Ex. 6 | STS-Na 1.0 g | EA-5721<br>U-15HA | 25 g<br>75 g | Transparent | 7 | 0.9 | |
| Ex. 7 | STS-Na 0.9 g | EA-5721<br>A-9530 | 25 g<br>75 g | Transparent | 8 | 1.1 | |
| Ex. 8 | STS-Na 2.8 g | EA-5721<br>A-9530 | 50 g | Transparent | 8 | 2.9 | |
| Ref. Ex. 2 | STS-Na 1.0 g | 80MFA<br>PE-3A | 65 g | Whitened | 30 | 34 | Hydrophilicity and transparency decreased. |

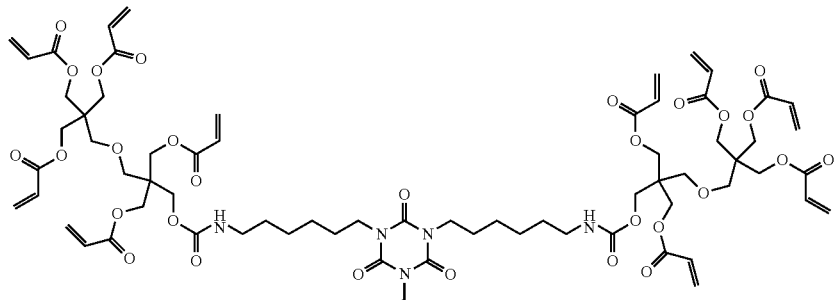

U-15HA

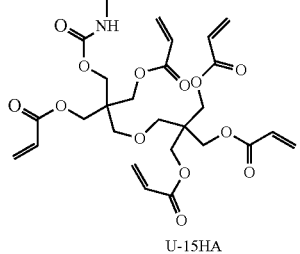

A-9530

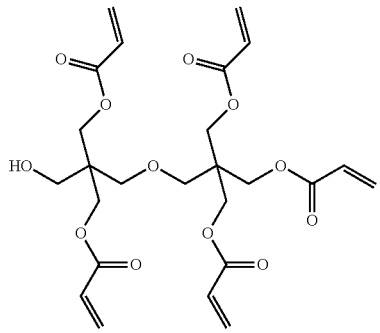

PE-3A

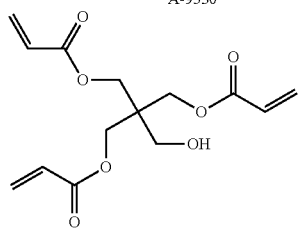

Examples 9 to 13, Reference Example 3 and Comparative Examples 6 to 12

A coating composition was prepared, applied onto a substrate and UV irradiated to form a monolayer film on the PC plate, and the surface of the film was washed with running water and dried in the same manner as in Example 1 except that the type of the compound (I) was changed from STS-Na to sodium allylsulfonate (hereinafter, referred to as AS-Na) and the amount thereof was changed as described in Table 4 below, and also the type of the compound (II) was changed as described in Table 4 below. The evaluation sample thus obtained was evaluated by the properties evaluation methods described hereinabove. The evaluation results are shown in Table 4.

240 W/cm, intensity 650 mW/cm², accumulated dose 130 mJ/cm², measured with UIT-150 manufactured by USHIO INC.) to form a 4 μm thick monolayer film on the PMMA

TABLE 4

| | Compound (I) | | Compound (II) or crosslinking monomer other than compounds (II) | | Appearance | Water contact angle (°) | Haze (%) | Remarks |
|---|---|---|---|---|---|---|---|---|
| Ex. 9 | AS-Na | 8.5 g | EA-5722 | 100 g | Transparent | 21 | 0.3 | |
| Ex. 10 | AS-Na | 5.0 g | EA-5720 | 100 g | Transparent | 21 | 0.6 | |
| Ex. 11 | AS-Na | 5.0 g | EA-5721 | 100 g | Transparent | 33 | 0.7 | |
| Ref. Ex. 3 | AS-Na | 5.0 g | 80-MFA | 100 g | Transparent | 26 | 0.6 | |
| Ex. 12 | AS-Na | 2.0 g | EA-5721 U-15HA | 50 g 50 g | Transparent | 18 | 0.7 | |
| Ex. 13 | AS-Na | 2.0 g | EA-5721 A-9530 | 50 g 50 g | Transparent | 18 | 2.9 | |
| Comp. Ex. 6 | AS-Na | 5.0 g | A-BPE-10 | 100 g | Whitened | 47 | 5.4 | Hydrophilicity and transparency decreased. |
| Comp. Ex. 7 | AS-Na | 5.0 g | A-BPE-30 | 100 g | Whitened | 32 | 7.2 | Transparency decreased. |
| Comp. Ex. 8 | AS-Na | 5.0 g | A-GLY-9E | 100 g | Whitened | 47 | 8.5 | Hydrophilicity and transparency decreased. |
| Comp. Ex. 9 | AS-Na | 5.0 g | ATM-35E | 100 g | Whitened | 38 | 6.7 | Hydrophilicity and transparency decreased. |
| Comp. Ex. 10 | AS-Na | 5.0 g | U-15HA | 100 g | Whitened | 14 | 20 | Transparency decreased. |
| Comp. Ex. 11 | AS-Na | 5.0 g | A-9530 | 100 g | Whitened | 5 | 24 | Transparency decreased. |
| Comp. Ex. 12 | AS-Na | 5.0 g | PE-4A | 100 g | Whitened | 7 | 16 | Transparency decreased. |

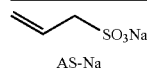

AS-Na

Comparative Example 13

Reproduction of Conventional Art (JP-A-2005-187576, Example 2)
(Preparation of Comparative Composition 30)

A uniform comparative composition 30 having a solid concentration of 50 wt % was prepared according to the formulation described in Table 5 below.

TABLE 5

| Comparative composition 30 (solid concentration 50%) | | | |
|---|---|---|---|
| Materials | Amount (g) | Concentration (wt %) | Remarks |
| AA: acrylic acid | 15.0 | 8.1% | Compound (I) |
| P-1A: acryloyloxy-2-ethyl phosphate | 5.0 | 2.7% | Compound (I) |
| Pentaerythritol tetraacrylate | 70.0 | 37.6% | Crosslinking monomer other than compounds (II) |
| 40 wt %-sodium hydroxide water | Nil | 0.0% | Agent for forming sodium salt of P-1A |
| 30%-isopropanol silica sol (Nissan Chemical Industries, Ltd.) | 10.0 | 5.4% | Filler |
| IPA: isopropanol | 43.0 | 23.1% | Solvent |
| Butyl acetate | 43.0 | 23.1% | Solvent |
| Total | 186.0 | 100.0% | |

(Application to Substrate and UV Irradiation)

A coating solution obtained by mixing the comparative composition 30 with 2 g of IRGACURE 184 (Ciba Specialty Chemicals, Inc.) as a polymerization initiator was applied onto a polymethyl methacrylate plate (size: 100 mm×100 mm, manufactured by Nitto Jushi Kogyo Co., Ltd., hereinafter referred to as PMMA plate) with a bar coater #06. The coating was dried at 100° C. for 5 minutes and was irradiated with UV (Fusion UV Systems, Japan, electrodeless H valve plate. Next, the surface of the film was washed with running water and was dried with a hot air dryer at 50° C. This film sample as of after water washing was evaluated by the properties evaluation methods described hereinabove. Further, the film that had been washed was soaked in a 10 wt % sodium hydroxide solution for 5 minutes, and the surface of the film was washed with running water and was dried with a hot air dryer at 50° C. This alkali-soaked film was subjected to the similar evaluations. The evaluation results are shown in Table 6 below. The monolayer film as of after washing with water and the alkali-soaked film exhibited low hydrophilicity and low transparency.

TABLE 6

| Evaluations of monolayer film | | |
|---|---|---|
| | Film after water washing | Film after alkali soaking (Sodium salt was formed after the production of the film.) |
| Appearance | Whitened | Whitened |
| Water contact angle (°) | 68 | 51 |
| Haze (%) | 7 | 14 |
| Intensity* of carboxyl groups at surface of film, Sa | 4.8E−02 | 3.9E−02 |
| Intensity* of carboxyl groups at middle of film, Da | 5.3E−02 | 4.6E−02 |
| Intensity* of carboxyl groups at bottom of film | 5.4E−02 | 4.2E−02 |
| Ratio of carboxyl group concentrations (Gradient Sa/Da) | 0.91 | 0.85 |
| Intensity** of phosphate groups at surface of film, Sa | 2.1E−02 | 2.2E−02 |
| Intensity** of phosphate groups at middle of film, Da | 2.2E−02 | 2.5E−02 |
| Intensity** of phosphate groups at bottom of film | 2.1E−02 | 2.4E−02 |
| Ratio of phosphate group concentrations (Gradient Sa/Da) | 0.95 | 0.88 |

*Relative intensity of $C_3H_3O_2^-$ (m/z = 71) (relative to total ions)
**Relative intensity of $C_2H_4PO_4^-$ (m/z = 123) (relative to total ions)

The analysis of the intensity of carboxyl groups and the intensity of phosphate groups was performed by the following method.

Analysis method: The sample was precisely cut at a bevel in the thickness direction, and the cross section was analyzed with TOF-SIMS.

Analyzer: TOF-SIMS manufactured by ION.TOF

Primary ions: $Bi_3^{2+}$

Accelerating voltage: 25 kV

Comparative Example 14

Reproduction of Conventional Art (JP-A-2005-187576, Example 5)

(Preparation of Comparative Composition 31)

An attempt was made to prepare a uniform comparative composition 31 having a solid concentration of 50 wt % by mixing the materials vigorously according to the formulation described in Table 7 below. Acrylamide-2-methylpropanesulfonic acid (ATBS) was not dissolved and the product was separated and white turbid.

TABLE 7

Comparative composition 31 (solid concentration 50 wt %)

| Materials | Amount (g) | Concentration (wt %) |
|---|---|---|
| PE-4A: pentaerythritol tetraacrylate | 50.0 | 26.9% |
| AA: acrylic acid | 35.0 | 18.8% |
| ATBS: acrylamide-2-methylpropanesulfonic acid | 5.0 | 2.7% |
| 30%-methanol silica sol (Nissan Chemical Industries, Ltd.) | 10.0 | 5.4% |
| Isopropanol | 86.0 | 46.2% |
| Total | 186.0 | 100.0% |

(Application to Substrate and UV Irradiation)

To the white turbid comparative composition 31, 3 g of perbutyl oxypivalate (Perbutyl PV, manufactured by NOF CORPORATION) as a thermal polymerization initiator was added. The mixture was stirred vigorously, but the coating liquid still remained nonuniform.

The separated and white turbid coating liquid was forced applied to a PMMA plate with a bar coater #06. The coating was dried at 100° C. for 5 minutes and was further heated at 60° C. for 8 hours and at 100° C. for 5 hours, thus forming a 4 μm thick monolayer film on the PMMA plate. As expected, the monolayer film obtained was white turbid due to the ATBS-derived components remaining separated. The film had low hydrophilicity and was so soft that it was easily scratched by a nail. The film was thus found to be incapable of serving as a monolayer film.

For confirmation, the film was evaluated in the same manner as in Comparative Example 13 after being washed with water and after being soaked in the alkali. The evaluation results are shown in Table 8.

TABLE 8

Coating test results

| | Film after water washing | Film after alkali soaking (Sodium salt was formed after the production of the film.) |
|---|---|---|
| Appearance | White turbid | White turbid |
| Water contact angle (°) | 53 | 50 |
| Haze (%) | 45 | 80 |
| Intensity* of carboxyl groups at surface of film, Sa | — | 2.5E−02 |
| Intensity* of carboxyl groups at middle of film, Da | — | 3.2E−02 |
| Intensity* of carboxyl groups at bottom of film | — | 3.1E−02 |
| Ratio of carboxyl group concentrations (Gradient Sa/Da) | | 0.78 |
| Intensity** of sulfonate groups at surface of film, Sa | — | 1.1E−03 |
| Intensity** of sulfonate groups at middle of film, Da | — | 2.6E−03 |
| Intensity** of sulfonate groups at bottom of film | — | 2.9E−03 |
| Ratio of sulfonate group concentrations (Gradient Sa/Da) | | 0.42 |

*Relative intensity of $C_3H_3O_2^-$ (m/z = 71) (relative to total ions)
**Relative intensity of $SO_3^-$ (m/z = 80) (relative to total ions)

The analysis of the intensity of carboxyl groups and the intensity of sulfonate groups was performed by the following method.

Analysis method: The sample was precisely cut at a bevel in the thickness direction, and the cross section was analyzed with TOF-SIMS.

Analyzer: TOF-SIMS manufactured by ION.TOF

Primary ions: $Bi_3^{2+}$

Accelerating voltage: 25 kV

Comparative Example 15

Reproduction of Conventional Art (JP-A-S55-90516, Example 1)

(Preparation of Coating Composition)

A uniform comparative coating composition 32 having a solid concentration of 36 wt % was prepared by mixing the materials vigorously according to the formulation described in Table 9 below.

TABLE 9

Comparative coating composition 32 (solid concentration 36 wt %)

| No. | Name | Amount (g) |
|---|---|---|
| 1 | Dipentaerythritol pentaacrylate | 19.7 |
| 2 | Polyethylene glycol dimethacrylate (number of repeating structural units "ethylene oxide" = 23) | 3.3 |
| 3 | Tetrahydrofurfuryl acrylate | 3.3 |
| 4 | N-lauryldiethanolamine | 2.6 |
| 5 | Methacryloyloxyethyl phosphate | 3.3 |
| 6 | Sulfoethyl methacrylate | 2.0 |
| 7 | N,N-dimethylformamide | 6.6 |
| 8 | Isopropanol | 46.0 |
| 9 | Toluene | 13.2 |
| 10 | Benzoin ethyl ether | 1.5 |
| 11 | Benzoyl peroxide | 0.7 |
| | Total | 102.2 |

(Application to Substrate and UV Irradiation)

The comparative coating composition 32 was applied onto a PMMA plate with a bar coater #08. The coating was allowed to stand at room temperature for 10 minutes and was thereafter irradiated with UV (manufactured by Fusion UV Systems, Japan, electrodeless discharge lamp.D valve, conveyer speed 5 m/min, intensity 670 mW/cm², accumulated dose 450 mJ/cm², measured with UIT-150 manufactured by USHIO INC.) to form a 3.5 μm thick monolayer film on the PMMA plate.

Because the surface of the monolayer film obtained was sticky due to the bleeding out of liquid, the surface was washed with running water and dried with an air gun. The sample was then evaluated by the properties evaluation methods described hereinabove. The evaluation results are shown in Table 10.

TABLE 10

Coating test results

|  | Comp. Ex. 15 |
| --- | --- |
| Appearance | Slightly whitened |
| Water contact angle | 58 |
| Haze | 2.4 |
| Crosscut adhesion | 0/100 |
| Antifouling properties | × |
| Antifogging properties | × |
| Intensity* of sulfonate groups at surface of film | 2.8E−02 |
| Intensity* of sulfonate groups at middle of film | 6.2E−02 |
| Intensity* of sulfonate groups at bottom of film | 7.6E−02 |
| Ratio of sulfonate group concentrations (surface/middle) | 0.5 |
| Intensity** of phosphate groups at surface of film | 6.0E−03 |
| Intensity** of phosphate groups at middle of film | 2.0E−02 |
| Intensity** of phosphate groups at bottom of film | 2.2E−02 |
| Ratio of phosphate group concentrations (surface/middle) | 0.3 |

*Relative intensity of SO₃⁻ (m/z = 80) (relative to total ions)
**Relative intensity of C₂H₄PO₄⁻ (m/z = 123) (relative to total ions)

The invention claimed is:

1. A monolayer film comprising a crosslinked resin obtained by polymerizing a composition including:

a compound (I) having an anionic hydrophilic group and a functional group with a polymerizable carbon-carbon double bond, and a compound (II) having three or more hydroxyl groups and three or more functional groups with a polymerizable carbon-carbon double bond, the monolayer film having a gradient (Sa/Da) of not less than 1.1 wherein Sa is the surface concentration of the anionic hydrophilic groups in the monolayer film, and Da is the deep concentration of the hydrophilic groups at ½ of the thickness of the monolayer film, and wherein the compound (I) is a compound represented by the general formula (100) below and A in the general formula (100) is a functional group with at least one polymerizable carbon-carbon double bond selected from the general formulas (121) to (125) below,

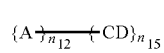
(100)

wherein CD is a group which includes at least one hydrophilic group selected from those groups represented by the general formulas (101) to (106) below; $n_{12}$ indicates the number of As bonded to CD and is 1 or 2; and $n_{15}$ indicates the number of CDs bonded to A and is an integer of 1 to 5:

(101)

wherein M is a hydrogen atom, an alkali metal, an alkaline earth metal having ½ atomic valence or an ammonium ion; and #1 indicates a hand bonded to a carbon atom present in A in the formula (100);

(102)

wherein M at each occurrence is a hydrogen atom, an alkali metal, an alkaline earth metal having ½ atomic valence or an ammonium ion; and #1 indicates a hand bonded to a carbon atom present in A in the formula (100);

(103)

wherein M is a hydrogen atom, an alkali metal, an alkaline earth metal having ½ atomic valence or an ammonium ion; and #1 at each occurrence indicates a hand bonded to a carbon atom present in A in the formula (100);

(104)

wherein M is a hydrogen atom, an alkali metal, an alkaline earth metal having ½ atomic valence, an ammonium ion or an amine ion; and #1 indicates a hand bonded to a carbon atom present in A in the formula (100);

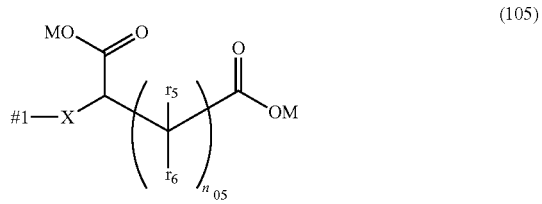
(105)

wherein $r_5$ and $r_6$ each independently represent a hydrogen atom, a methyl group, an ethyl group or a hydroxyl group; $n_{05}$ is an integer of 0 to 5; X is —O—, —S—, —NH— or —NCH₃—; M at each occurrence is a hydrogen atom, an alkali metal, an alkaline earth metal having ½ atomic valence or an ammonium ion; and #1 indicates a hand bonded to a carbon atom present in A in the formula (100); and

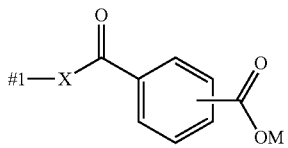
(106)

wherein X is —O—, —S—, —NH— or —NCH$_3$—; M is a hydrogen atom, an alkali metal, an alkaline earth metal having ½ atomic valence or an ammonium ion; and #1 indicates a hand bonded to a carbon atom present in A in the formula (100),

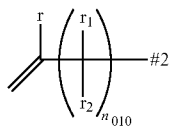
(121)

wherein r represents a hydrogen atom or a methyl group; $r_1$ and $r_2$ each independently represent a hydrogen atom, a methyl group, an ethyl group or a hydroxyl group; $n_{010}$ is an integer of 0 to 10; and #2 indicates a hand bonded to #1 present in at least one croup selected from those groups represented by the general formulas (101) to (106);

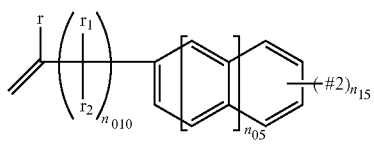
(122)

wherein r represents a hydrogen atom or a methyl group; $r_1$ and $r_2$ each independently represent a hydrogen atom, a methyl group, an ethyl group or a hydroxyl group; $n_{010}$ is an integer of 0 to 10; $n_{05}$ is an integer of 0 to 5; $n_{15}$ is an integer of 1 to 5; and #2 indicates a hand bonded to #1 present in at least one group selected from those groups represented by the general formulas (101) to (106);

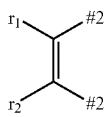
(123)

wherein $r_1$ and $r_g$ each independently represent a hydrogen atom, a methyl group, an ethyl group or a hydroxyl group; and #2 at each occurrence indicates a hand bonded to #1 present in at least one group selected from those groups represented by the general formulas (101) to (106);

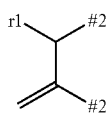
(124)

wherein $r_1$ represents a hydrogen atom, a methyl group, an ethyl group or a hydroxyl group; and #2 at each occurrence indicates a hand bonded to #1 present in at least one group selected from those groups represented by the general formulas (101) to (106); and

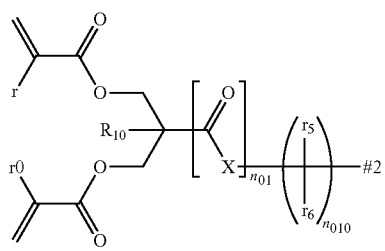
(125)

wherein X is —O—, —S—, —NH— or —NCH$_3$—; r and r0 each independently represent a hydrogen atom or a methyl group; $r_5$ and $r_6$ each independently represent a hydrogen atom, a methyl group, an ethyl group or a hydroxyl group; $R_{10}$ represents a hydrogen atom, a $C_{1-10}$ alkyl group, a $C_{3-10}$ cycloalkyl group, a phenyl group, a benzyl group, a hydroxyl group, hydroxymethyl or hydroxyethyl; $n_{01}$ represents 0 or 1; $n_{010}$ is an integer of 1 to 10; and #2 indicates a hand bonded to #1 present in at least one group selected from those groups represented by the general formulas (101) to (106).

2. The monolayer film according to claim 1, wherein the compound (II) is a compound represented by the general formula (200) below:

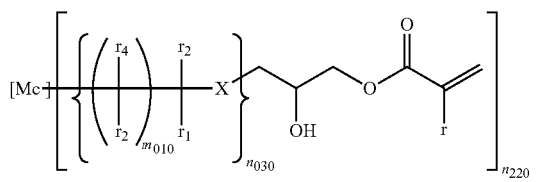
(200)

wherein Mc indicates at least one group selected from those groups represented by the general formulas (201) to (209) below; X is —O—, —S—, —NH— or —NCH$_3$—; r is a hydrogen atom or a methyl group; r1 to r4 each independently represent a hydrogen atom, a methyl group, an ethyl group or a hydroxyl group; $m_{010}$ is an integer of 0 to 10; $n_{030}$ is an integer of 0 to 30; and $n_{220}$ is an integer of 3 to 20:

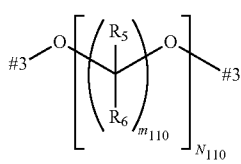
(201)

wherein $m_{110}$ is an integer of 1 to 10; $N_{110}$ is an integer of 1 to 10; #3 at each occurrence indicates a hydrogen atom or a hand bonded to a carbon atom present in the group represented by the formula (200); $R_5$ represents —O-#3 or —CH$_2$O—#3; $R_6$ represents a hydrogen atom, a hydroxyl group, —O-#3, —CH$_2$OH, —CH$_2$O—#3 or a C$_{1-4}$ alkyl group; when m$_{110}$ is 2 or greater, R$_5$s and R$_6$s each may be the same as or different from one another; when m$_{110}$ is 2 or greater, #3s may be the same as or different from one another; and there are the same number of hands #3 bonded to a carbon atom present in the group represented by the formula (200) as the number indicated by n$_{220}$ in the formula (200);

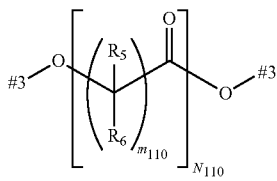
(202)

wherein m$_{110}$ is an integer of 1 to 10; N$_{110}$ is an integer of 1 to 10; #3 at each occurrence indicates a hydrogen atom or a hand bonded to a carbon atom present in the group represented by the formula (200); R$_5$ represents —O-#3 or —CH$_2$O—#3; R$_6$ represents a hydrogen atom, a hydroxyl group, —O-#3, —CH$_2$OH, —CH$_2$O—#3 or a C$_{1-4}$ alkyl group; when m$_{110}$ is 2 or greater, R$_5$s and R$_6$s each may be the same as or different from one another; when m$_{110}$ is 2 or greater, #3s may be the same as or different from one another; and there are the same number of hands #3 bonded to a carbon atom present in the group represented by the formula (200) as the number indicated by n$_{220}$ in the formula (200);

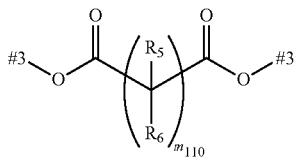
(203)

wherein m$_{110}$ is an integer of 1 to 10; #3 at each occurrence indicates a hydrogen atom or a hand bonded to a carbon atom present in the group represented by the formula (200); R$_5$ represents —O-#3 or —CH$_2$O-#3; R$_6$ represents a hydrogen atom, a hydroxyl group, —O-#3, —CH$_2$OH, —CH$_2$O-#3 or a C$_{1-4}$ alkyl group; when m$_{110}$ is 2 or greater, R$_5$s and R$_5$s each may be the same as or different from one another; when m$_{110}$ is 2 or greater, #3s may be the same as or different from one another; and there are the same number of hands #3 bonded to a carbon atom present in the group represented by the formula (200) as the number indicated by n$_{220}$ in the formula (200);

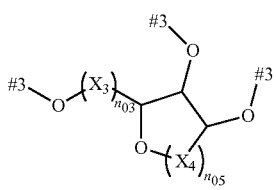
(204)

wherein n$_{03}$ is an integer of 0 to 3; n$_{05}$ is an integer of 0 to 5; #3 at each occurrence indicates a hydrogen atom or a hand bonded to a carbon atom present in the group represented by the formula (200); X$_3$ and X$_4$ each independently represent —CH$_2$—, —CH(OH)—, —CH(—O-#3)- or —CO—; when n$_{03}$ is 2 or greater, X$_3$s may be the same as or different from one another; when n$_{05}$ is 2 or greater, X$_4$s may be the same as or different from one another; the cycloalkylether ring in the formula (204) may have one or more carbon-carbon double bonds in place of a carbon-carbon bond; and there are the same number of hands #3 bonded to a carbon atom present in the group represented by the formula (200) as the number indicated by n$_{220}$ in the formula (200);

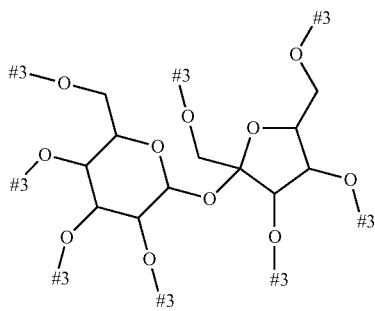
(205)

wherein #3 at each occurrence indicates a hydrogen atom or a hand bonded to a carbon atom present in the group represented by the formula (200); and there are the same number of hands #3 bonded to a carbon atom present in the group represented by the formula (200) as the number indicated by n$_{220}$ in the formula (200);

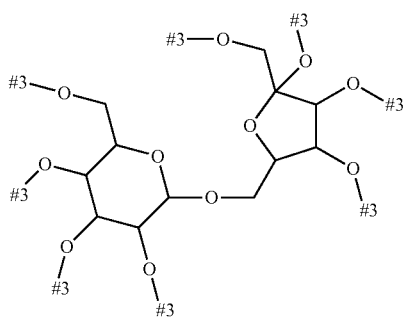
(206)

wherein #3 at each occurrence indicates a hydrogen atom or a hand bonded to a carbon atom present in the group represented by the formula (200); and there are the same number of hands #3 bonded to a carbon atom present in the group represented by the formula (200) as the number indicated by n$_{220}$ in the formula (200);

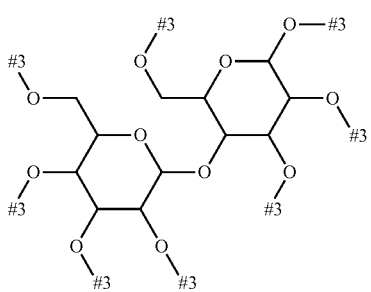 (207)

wherein #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200);

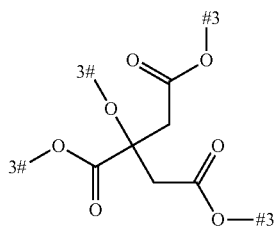 (208)

wherein #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200); and

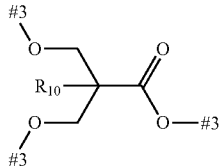 (209)

wherein $R_{10}$ is a hydrogen atom, a $C_{1-10}$ alkyl group, a $C_{3-10}$ cycloalkyl group, a phenyl group, a benzyl group, a hydroxyl group, a hydroxymethyl group or a hydroxyethyl group; #3 at each occurrence indicates a hydrogen atom or a hand bonded to a carbon atom present in the group represented by the formula (200); and there are the same number of hands #3 bonded to a carbon atom present in the group represented by the formula (200) as the number indicated by $n_{220}$ in the formula (200).

3. A stack comprising at least one monolayer film described in claim 1.

4. A stack comprising at least one monolayer film described in claim 2.

* * * * *